US012574057B2

(12) United States Patent
Uejima et al.

(10) Patent No.: US 12,574,057 B2
(45) Date of Patent: Mar. 10, 2026

(54) HIGH FREQUENCY MODULE, COMMUNICATION APPARATUS, AND METHOD FOR MANUFACTURING HIGH FREQUENCY MODULE

(71) Applicant: Murata Manufacturing Co., Ltd., Kyoto (JP)

(72) Inventors: Takanori Uejima, Kyoto (JP); Hiromichi Kitajima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 341 days.

(21) Appl. No.: 18/531,809

(22) Filed: Dec. 7, 2023

(65) Prior Publication Data

US 2024/0106468 A1 Mar. 28, 2024

Related U.S. Application Data

(63) Continuation of application No. PCT/JP2022/017829, filed on Apr. 14, 2022.

(30) Foreign Application Priority Data

Jun. 11, 2021 (JP) ................................. 2021-098301

(51) Int. Cl.
 *H04B 1/40* (2015.01)
 *H04B 1/03* (2006.01)
 (Continued)

(52) U.S. Cl.
 CPC ................. *H04B 1/03* (2013.01); *H04B 1/04* (2013.01)

(58) Field of Classification Search
 CPC ... H04B 1/03; H04B 1/04; H04B 1/08; H04B 1/16; H04B 1/40; H04M 1/02;
 (Continued)

(56) References Cited

U.S. PATENT DOCUMENTS 6,555,763 B1 * 4/2003 Hirasawa ............ H01L 21/4857
 174/262
10,561,012 B2 2/2020 Chen
 (Continued)

FOREIGN PATENT DOCUMENTS

JP 2007-294828 A 11/2007
JP 2008-034778 A 2/2008
 (Continued)

OTHER PUBLICATIONS

International Search Report for PCT/JP2022/017829 dated Jun. 21, 2022.

*Primary Examiner* — Andrew Wendell
(74) *Attorney, Agent, or Firm* — McDonald Hopkins LLC

(57) ABSTRACT

An increase in cost can be suppressed. A high frequency module includes a mounting substrate, a first electronic component, a second electronic component, a resin layer, and a metal layer. The first electronic component and the second electronic component are disposed on a first main surface of the mounting substrate. The metal layer has a ground potential and covers a part of the resin layer. The metal layer overlaps a part of the first electronic component and overlaps a part of the second electronic component in plan view from a thickness direction of the mounting substrate. A height of the first electronic component is lower than a height of the second disposal condition in the thickness direction of the mounting substrate. A part of a main surface of the first electronic component that is far away from the mounting substrate is in contact with the metal layer.

14 Claims, 11 Drawing Sheets

(51) Int. Cl.
  H04B 1/04       (2006.01)
  H04B 1/16       (2006.01)
(58) Field of Classification Search
  CPC ..... H04M 1/026; H04M 1/0277; H01L 23/00;
          H01L 23/12; H01L 25/00; H01L 25/065;
          H01L 25/07; H01L 25/18; H03H 3/08;
                          H03H 9/25; H03H 9/64
  See application file for complete search history.

(56)                    References Cited

U.S. PATENT DOCUMENTS

| | | | |
|---|---|---|---|
| 10,602,612 B1 * | 3/2020 | Hoang | H05K 3/284 |
| 2009/0091904 A1 | 4/2009 | Hatanaka et al. | |
| 2015/0008789 A1 | 1/2015 | Iwamoto | |
| 2019/0140615 A1 | 5/2019 | Fujiya et al. | |
| 2019/0239347 A1 * | 8/2019 | Tanaka | H05K 3/321 |
| 2019/0289758 A1 * | 9/2019 | Furuya | H05K 5/065 |
| 2019/0363031 A1 * | 11/2019 | Kamada | H05K 9/0024 |
| 2019/0393166 A1 * | 12/2019 | Otsubo | H01L 23/5383 |
| 2020/0203291 A1 | 6/2020 | Uejima | |
| 2020/0245465 A1 * | 7/2020 | Zhang | H05K 1/183 |
| 2020/0411395 A1 | 12/2020 | Bozorg-Grayeli et al. | |
| 2021/0005579 A1 | 1/2021 | Matsumoto | |
| 2021/0098332 A1 * | 4/2021 | Wang | H01L 24/29 |
| 2021/0183782 A1 * | 6/2021 | Yasukawa | H01L 23/12 |
| 2021/0242892 A1 * | 8/2021 | Jo | H01Q 1/2283 |
| 2021/0375818 A1 * | 12/2021 | Nishihara | H01L 24/32 |
| 2022/0028842 A1 * | 1/2022 | Chang | H01L 23/3128 |
| 2022/0189839 A1 * | 6/2022 | Eid | H01L 24/33 |

FOREIGN PATENT DOCUMENTS

| | | |
|---|---|---|
| JP | 2020-102693 A | 7/2020 |
| WO | 2013/146374 A1 | 10/2013 |
| WO | 2014/013831 A1 | 1/2014 |
| WO | 2018/003819 A1 | 1/2018 |
| WO | 2019/181590 A1 | 9/2019 |

* cited by examiner

HIGH FREQUENCY MODULE, COMMUNICATION APPARATUS, AND METHOD FOR MANUFACTURING HIGH FREQUENCY MODULE

CROSS REFERENCE TO RELATED APPLICATION

This is a continuation of International Application No. PCT/JP2022/017829 filed on Apr. 14, 2022 which claims priority from Japanese Patent Application No. 2021-098301 filed on Jun. 11, 2021. The contents of these applications are incorporated herein by reference in their entireties.

BACKGROUND ART

Technical Field

The present disclosure relates, generally, to a high frequency module, a communication apparatus, and a method for manufacturing a high frequency module, and more particularly, to a high frequency module including a mounting substrate, a communication apparatus including a high frequency module, and a method for manufacturing a high frequency module including a mounting substrate.

In Patent Document 1, a high frequency module including a mounting substrate, a power amplifier (a second electronic component), a transmission filter (a first electronic component), a resin member (a resin layer), and a shield electrode layer (a metal layer) is described. The mounting substrate has a first main surface and a second main surface that are opposite to each other. The power amplifier and the transmission filter are mounted on the first main surface of the mounting substrate. The resin member covers top surfaces and side surfaces of the power amplifier and the transmission filter. The shield electrode layer covers a top surface and a side surface of the resin member.

Patent Document 1: International Publication No. 2019/181590

BRIEF SUMMARY

In the high frequency module described in Patent Document 1, for example, to make the top surface of the first electronic component whose height is lower than that of the second electronic component in contact with the shield electrode layer, a substrate that forms the first electronic component needs to be formed thick. This contributes to a problem of cost increase.

The present disclosure provides a high frequency module, a communication apparatus, and a method for manufacturing a high frequency module capable of suppressing an increase in cost.

A high frequency module according to an aspect of the present disclosure includes a mounting substrate, a first electronic component, a second electronic component, a resin layer, and a metal layer. The mounting substrate has a first main surface and a second main surface that are opposite to each other. The first electronic component and the second electronic component are disposed on the first main surface of the mounting substrate. The resin layer is disposed on the first main surface of the mounting substrate. The metal layer covers at least part of the resin layer. The resin layer covers at least part of an outer peripheral surface of the first electronic component and covers at least part of an outer peripheral surface of the second electronic component. The metal layer has a ground potential. The metal layer overlaps at least part of the first electronic component and overlaps at least part of the second electronic component in plan view from a thickness direction of the mounting substrate. A height of the first electronic component is lower than a height of the second electronic component in the thickness direction of the mounting substrate. At least part of a main surface of the first electronic component that is far away from the mounting substrate is in contact with the metal layer.

A communication apparatus according to an aspect of the present disclosure includes the high frequency module and a signal processing circuit. The signal processing circuit is connected to the high frequency module.

A method for manufacturing a high frequency module according to an aspect of the present disclosure includes a first forming step; a second forming step; and a third forming step. The first forming step is a step of forming a resin member on a first main surface of a mounting substrate in such a manner that the resin member covers a first electronic component and a second electronic component that are disposed on the first main surface of the mounting substrate that has the first main surface and a second main surface that are opposite to each other. A height of the second electronic component is higher than a height of the first electronic component in a thickness direction of the mounting substrate. The second forming step is a step of forming a resin layer that has a recessed part in such a manner that a main surface of the first electronic component that is far away from the mounting substrate is exposed. The third forming step is a step of forming a metal layer that has a ground potential in such a manner that the metal layer covers a main surface of the resin layer that is far away from the mounting substrate.

With a high frequency module, a communication apparatus, and a method for manufacturing a high frequency module according to aspects of the present disclosure, an increase in cost can be suppressed.

BRIEF DESCRIPTION OF THE DRAWINGS

FIG. 5 is a circuit configuration diagram of a communication apparatus including the high frequency module.

FIG. 7 is a cross-section view illustrating a second forming step of the method for manufacturing the high frequency module.

DETAILED DESCRIPTION

Figure 1:
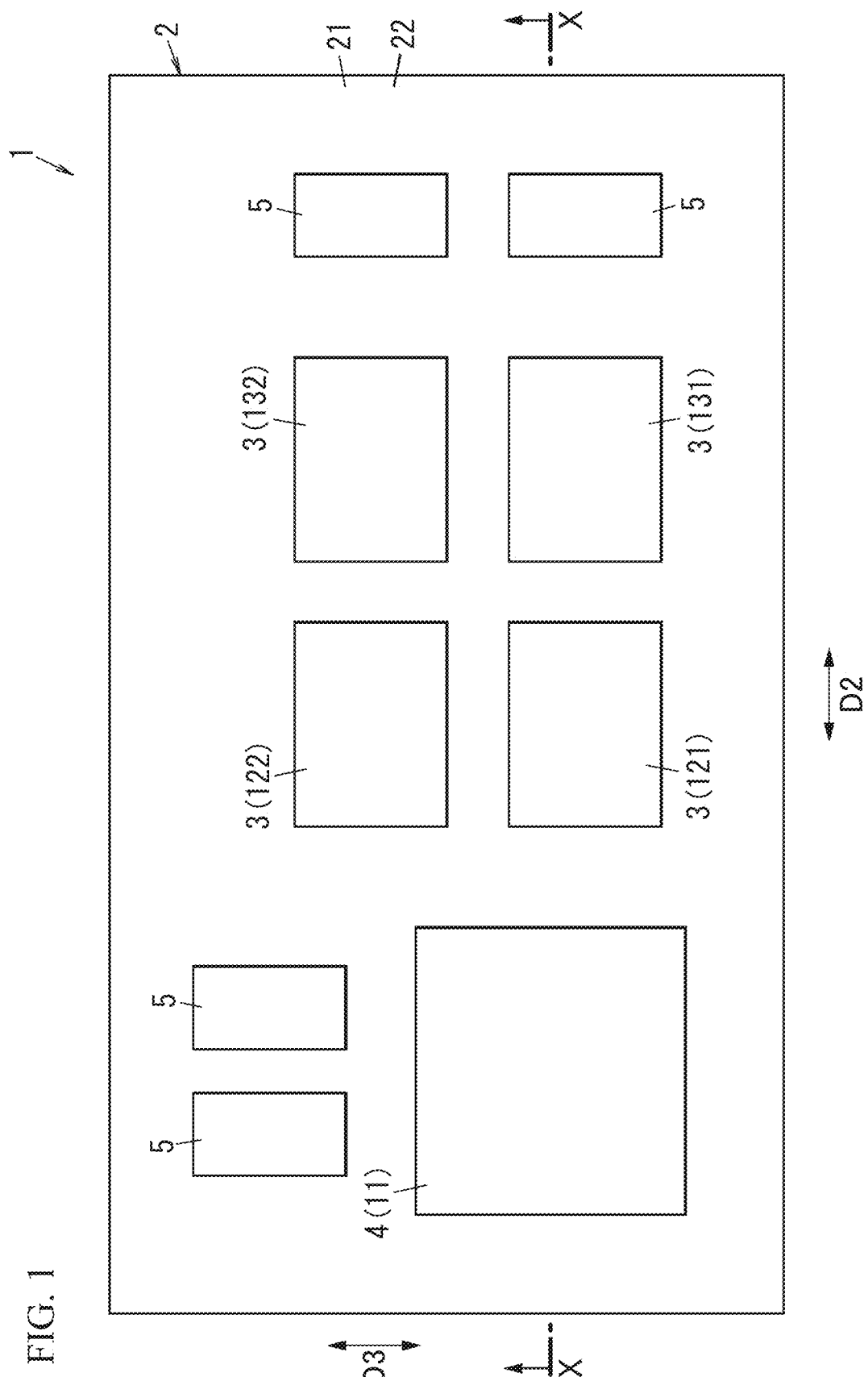
FIG. 1 is a plan view of a high frequency module according to a first embodiment.

Hereinafter, high frequency modules and communication apparatuses according to first to fifth embodiments will be described with reference to drawings. FIGS. 1 to 4 and FIGS. 6 to 12 that will be referenced in the embodiments and other descriptions provided below are schematic diagrams, and ratios of the sizes and the thicknesses of component elements in these figures do not necessarily correspond to the actual dimensional ratios.

First Embodiment (1) High Frequency Module

A configuration of a high frequency module 1 according to the first embodiment will be described with reference to drawings.

Figure 5:
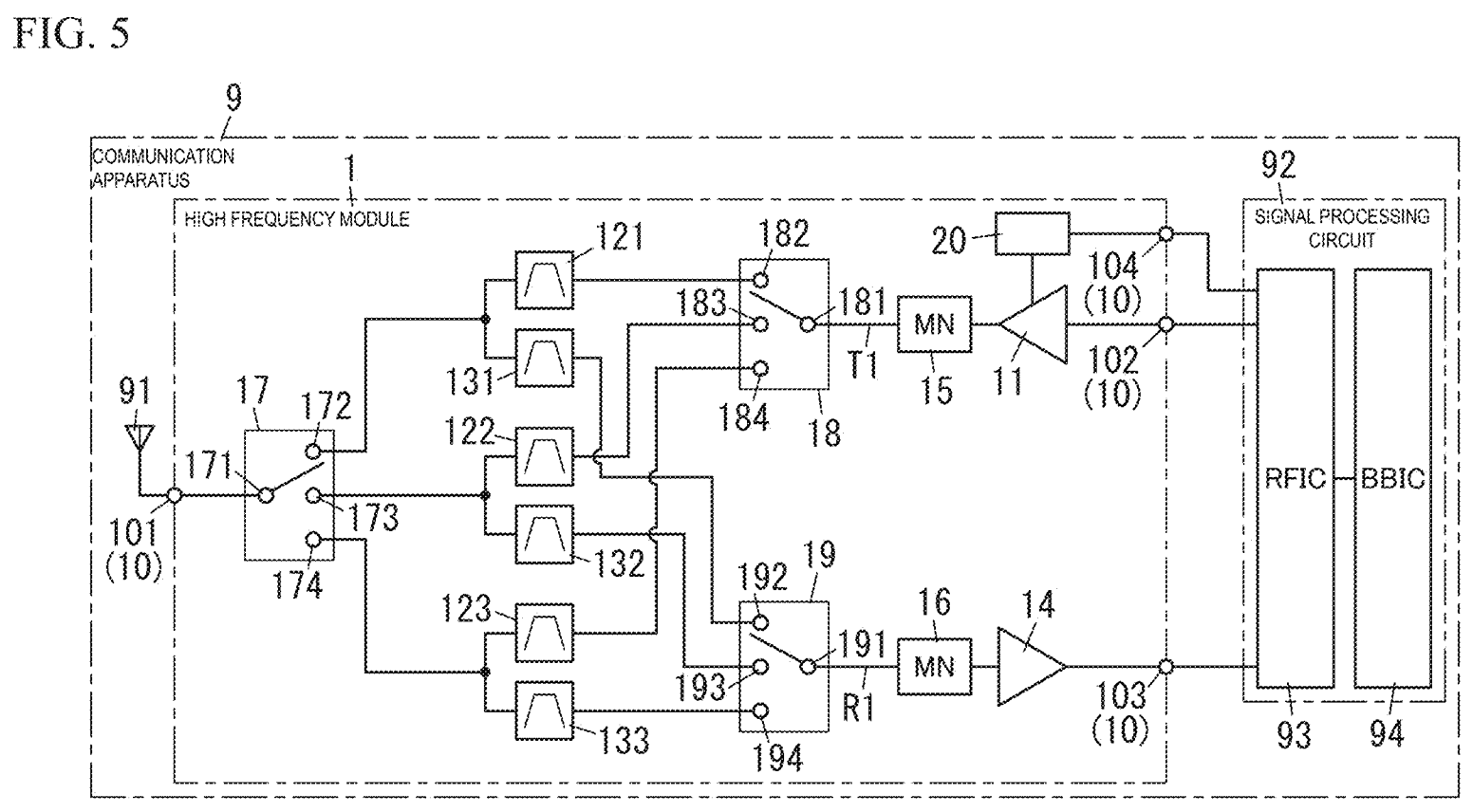

The high frequency module 1 is, as illustrated in FIG. 5, used for, for example, a communication apparatus 9. The communication apparatus 9 is, for example, a mobile phone such as a smartphone. The communication apparatus 9 is not limited to a mobile phone and may be, for example, a wearable terminal such as a smartwatch. The high frequency module 1 is, for example, a module capable of supporting 4G (fourth generation mobile communications) standards and 5G (fifth generation mobile communications) standards. The 4G standards are, for example, 3GPP (registered trademark, Third Generation Partnership Project) LTE (registered trademark, Long Term Evolution) standards. The 5G standards are, for example, 5G NR (New Radio). The high frequency module 1 is, for example, a module capable of supporting carrier aggregation and dual connectivity.

The communication apparatus 9 performs communication using multiple communication bands. More particularly, the communication apparatus 9 performs transmission of transmission signals of multiple communication bands and reception of reception signals of multiple communication bands.

Part of transmission signals and reception signals of multiple communication bands are signals of FDD (Frequency Division Duplex). Transmission signals and reception signals of multiple communication bands are not limited to signals of FDD and may be signals of TDD (Time Division Duplex). FDD is a wireless communication technique for allocating different frequency bands to transmission and reception in wireless communications and performing transmission and reception. TDD is a wireless communication technique for allocating the same frequency band to transmission and reception in wireless communications and switching between transmission and reception from one time to another.

(2) Circuit Configuration of High Frequency Module

A circuit configuration of the high frequency module 1 according to the first embodiment will be described below with reference to FIG. 5.

The high frequency module 1 according to the first embodiment includes, as illustrated in FIG. 5, a power amplifier 11, a plurality of (in the example illustrated in the drawing, three) transmission filters 121 to 123, a plurality of (in the example illustrated in the drawing, three) reception filters 131 to 133, and a low noise amplifier 14. The high frequency module 1 further includes an output matching circuit 15, an input matching circuit 16, a first switch 17, a second switch 18, a third switch 19, and a controller 20. Furthermore, the high frequency module 1 further includes a plurality of (in the example illustrated in the drawing, four) external connection terminals 10.

(2.1) Power Amplifier

The power amplifier 11 illustrated in FIG. 5 is an amplifier that amplifies transmission signals. The power amplifier 11 is provided between a signal input terminal 102 and the plurality of transmission filters 121 to 123 on a transmission path T1 that connects an antenna terminal 101 to the signal input terminal 102, which will be described later. The power amplifier 11 includes an input terminal (not illustrated in the drawing) and an output terminal (not illustrated in the drawing). The input terminal of the power amplifier 11 is connected to an external circuit (for example, a signal processing circuit 92) with the signal input terminal 102 interposed therebetween. The output terminal of the power amplifier 11 is connected to the plurality of transmission filters 121 to 123. The power amplifier 11 is controlled by, for example, the controller 20. The power amplifier 11 may be connected to the plurality of transmission filters 121 to 123 directly or indirectly. In the example of FIG. 5, the power amplifier 11 is connected to the plurality of transmission filters 121 to 123 with the output matching circuit 15 interposed therebetween.

(2.2) Transmission Filters

The plurality of transmission filters 121 to 123 illustrated in FIG. 5 are filters that allow transmission signals of different communication bands to pass therethrough. The plurality of transmission filters 121 to 123 are provided at the transmission path T1, which is a signal path through which transmission signals pass. More particularly, the plurality of transmission filters 121 to 123 are provided between the power amplifier 11 and the first switch 17 on the transmission path T1. Each of the plurality of transmission filters 121 to 123 allows a transmission signal of a transmission band of a corresponding communication band among high frequency signals amplified by the power amplifier 11 to pass therethrough.

(2.3) Reception Filters

The plurality of reception filters 131 to 133 illustrated in FIG. 5 are filters that allow reception signals of different communication bands to pass therethrough. The plurality of reception filters 131 to 133 are provided at a reception path R1, which is a signal path through which reception signals pass. More particularly, the plurality of reception filters 131 to 133 are provided between the first switch 17 and the low noise amplifier 14 on the reception path R1 that connects the antenna terminal 101 to a signal output terminal 103, which will be described later. Each of the plurality of reception filters 131 to 133 allows a reception signal of a reception band of a corresponding communication band among high frequency signals input from the antenna terminal 101 to pass therethrough.

(2.4) Low Noise Amplifier

The low noise amplifier 14 illustrated in FIG. 5 is an amplifier that amplifies reception signals with low noise. The low noise amplifier 14 is provided between the plurality of reception filters 131 to 133 and the signal output terminal 103 on the reception path R1. The low noise amplifier 14 includes an input terminal (not illustrated in the drawing) and an output terminal (not illustrated in the drawing). The input terminal of the low noise amplifier 14 is connected to the input matching circuit 16. The output terminal of the low noise amplifier 14 is connected to an external circuit (for example, the signal processing circuit 92) with the signal output terminal 103 interposed therebetween.

(2.5) Output Matching Circuit

The output matching circuit 15 is, as illustrated in FIG. 5, provided between the power amplifier 11 and the plurality of transmission filters 121 to 123 on the transmission path T1. The output matching circuit 15 is a circuit for achieving impedance matching between the power amplifier 11 and the plurality of transmission filters 121 to 123.

The output matching circuit 15 includes an inductor. The inductor of the output matching circuit 15 is provided on the output side of the power amplifier 11 on the transmission path T1. The output matching circuit 15 does not necessarily include only one inductor. For example, the output matching circuit 15 may include a plurality of inductors or may include a plurality of inductors and a plurality of capacitors. In short, the output matching circuit 15 includes at least one inductor.

(2.6) Input Matching Circuit

The input matching circuit 16 is, as illustrated in FIG. 5, provided between the plurality of reception filters 131 to 133 and the low noise amplifier 14 on the reception path R1. The input matching circuit 16 is a circuit for achieving impedance matching between the plurality of reception filters 131 to 133 and the low noise amplifier 14.

The input matching circuit 16 includes an inductor. The inductor of the input matching circuit 16 is provided on the input side of the low noise amplifier 14 on the reception path R1. The input matching circuit 16 does not necessarily include only one inductor. For example, the input matching circuit 16 may include a plurality of inductors or may include a plurality of inductors and a plurality of capacitors. In short, the input matching circuit 16 includes at least one inductor.

(2.7) First Switch

The first switch 17 illustrated in FIG. 5 performs switching of a transmission filter to be connected to the antenna terminal 101 from among the plurality of transmission filters 121 to 123. Furthermore, the first switch 17 performs switching of a reception filter to be connected to the antenna terminal 101 from among the plurality of reception filters 131 to 133. That is, the first switch 17 is a switch for performing switching of a path to be connected to an antenna 91. The first switch 17 includes a common terminal 171 and a plurality of (in the example illustrated in the drawing, three) selection terminals 172 to 174. The common terminal 171 is connected to the antenna terminal 101. Furthermore, the common terminal 171 is connected to the antenna 91 with the antenna terminal 101 interposed therebetween. The selection terminal 172 is connected to the transmission filter 121 and the reception filter 131. The selection terminal 173 is connected to the transmission filter 122 and the reception filter 132. The selection terminal 174 is connected to the transmission filter 123 and the reception filter 133.

The first switch 17 performs switching of the connection state between the common terminal 171 and the plurality of selection terminals 172 to 174. The first switch 17 is, for example, controlled by the signal processing circuit 92. The first switch 17 electrically connects the common terminal 171 to at least one of the plurality of selection terminals 172 to 174 in accordance with a control signal from an RF signal processing circuit 93 of the signal processing circuit 92.

(2.8) Second Switch

The second switch 18 illustrated in FIG. 5 performs switching of a transmission filter to be connected to the power amplifier 11 from among the plurality of transmission filters 121 to 123. That is, the second switch 18 is a switch for performing switching of a path to be connected to the power amplifier 11. The second switch 18 includes a common terminal 181 and a plurality of (in the example illustrated in the drawing, three) selection terminals 182 to 184. The common terminal 181 is connected to the power amplifier 11. The selection terminal 182 is connected to the transmission filter 121. The selection terminal 183 is connected to the transmission filter 122. The selection terminal 184 is connected to the transmission filter 123.

The second switch 18 performs switching of the connection state between the common terminal 181 and the plurality of selection terminals 182 to 184. The second switch 18 is, for example, controlled by the signal processing circuit 92. The second switch 18 electrically connects the common terminal 181 to at least one of the plurality of selection terminals 182 to 184 in accordance with a control signal from the RF signal processing circuit 93 of the signal processing circuit 92.

(2.9) Third Switch

The third switch 19 illustrated in FIG. 5 performs switching of a reception filter to be connected to the low noise amplifier 14 from among the plurality of reception filters 131 to 133. That is, the third switch 19 is a switch for performing switching of a path to be connected to the low noise amplifier 14. The third switch 19 includes a common terminal 191 and a plurality of (in the example illustrated in the drawing, three) selection terminals 192 to 194. The common terminal 191 is connected to the low noise amplifier 14. The selection terminal 192 is connected to the reception filter 131. The selection terminal 193 is connected to the reception filter 132. The selection terminal 194 is connected to the reception filter 133.

The third switch 19 performs switching of the connection state between the common terminal 191 and the plurality of selection terminals 192 to 194. The third switch 19 is, for example, controlled by the signal processing circuit 92. The third switch 19 electrically connects the common terminal 191 to at least one of the plurality of selection terminals 192 to 194 in accordance with a control signal from the RF signal processing circuit 93 of the signal processing circuit 92.

(2.10) Controller

The controller 20 controls the power amplifier 11, for example, in accordance with a control signal from the signal processing circuit 92. The controller 20 is connected to the power amplifier 11. The controller 20 is also connected to the signal processing circuit 92 with a plurality of (for example, four) control terminals 104 interposed therebetween. The plurality of control terminals 104 are terminals for inputting control signals from an external circuit (for example, the signal processing circuit 92) to the controller 20. The controller 20 controls the power amplifier 11 in accordance with control signals acquired from the plurality of control terminals 104. The control signals that the controller 20 acquires from the plurality of control terminals 104 are digital signals. The number of the control terminals 104 is, for example, four. However, only one control terminal 104 is illustrated in FIG. 5.

(2.11) External Connection Terminals

The plurality of external connection terminals 10 are, as illustrated in FIG. 5, terminals for electrically connecting to an external circuit (for example, the signal processing circuit 92). The plurality of external connection terminals 10 include the antenna terminal 101, the signal input terminal 102, the signal output terminal 103, the plurality of control terminals 104, and a plurality of ground terminals (not illustrated in the drawing).

The antenna terminal 101 is connected to the antenna 91. In the high frequency module 1, the antenna terminal 101 is connected to the first switch 17. The antenna terminal 101 is also connected to the plurality of transmission filters 121 to 123 and the plurality of reception filters 131 to 133 with the first switch 17 interposed therebetween.

The signal input terminal 102 is a terminal for inputting a transmission signal from an external circuit (for example, the signal processing circuit 92) to the high frequency module 1. In the high frequency module 1, the signal input terminal 102 is connected to the power amplifier 11.

The signal output terminal 103 is a terminal for outputting a reception signal from the low noise amplifier 14 to an external circuit (for example, the signal processing circuit 92). In the high frequency module 1, the signal output terminal 103 is connected to the low noise amplifier 14.

The plurality of control terminals 104 are terminals for inputting control signals from an external circuit (for example, the signal processing circuit 92) to the high frequency module 1. In the high frequency module 1, the plurality of control terminals 104 are connected to the controller 20.

The plurality of ground terminals are terminals that are electrically connected to a ground electrode at an external substrate (not illustrated in the drawing) provided in the communication apparatus 9, and a ground potential is applied to the plurality of ground terminals. In the high frequency module 1, the plurality of ground terminals are connected to a ground layer 24 of a mounting substrate 2 (see FIG. 2).

(3) Structure of High Frequency Module

A structure of the high frequency module 1 according to the first embodiment will be described below with reference to drawings.

Figure 2:
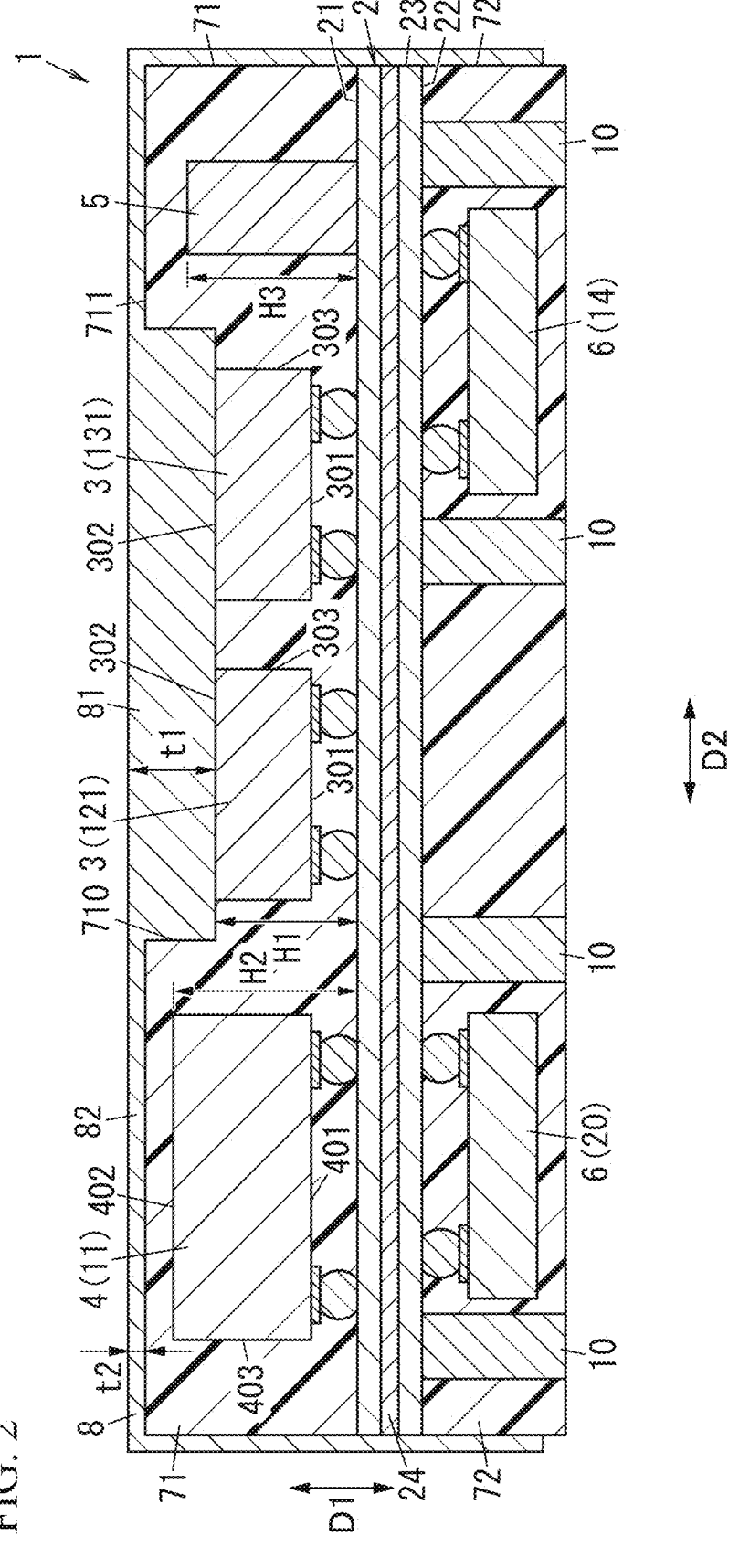
FIG. 2 is a cross-section view of the high frequency module taken along line X-X of FIG. 1.

The high frequency module 1 includes, as illustrated in FIGS. 1 and 2, the mounting substrate 2, a plurality of (in the example illustrated in the drawing, four) first electronic components 3, a second electronic component 4, a plurality of (in the example illustrated in the drawing, four) third electronic components 5, a plurality of (in the example illustrated in the drawing, two) fourth electronic components 6, and the plurality of external connection terminals 10. The high frequency module 1 further includes a first resin layer 71, a second resin layer 72, and a metal layer 8.

The high frequency module 1 is capable of electrically connecting to an external substrate (not illustrated in drawings). The external substrate corresponds to, for example, a motherboard of the communication apparatus 9 (see FIG. 5) such as a mobile phone or a communication device. The configuration in which the high frequency module 1 is capable of electrically connecting to an external substrate includes not only a case where the high frequency module 1 is mounted directly on the external substrate but also a case where the high frequency module 1 is mounted indirectly on the external substrate. Furthermore, the case where the high frequency module 1 is mounted indirectly on the external substrate includes a case where the high frequency module 1 is mounted on another high frequency module that is mounted on the external substrate.

(3.1) Mounting Substrate

The mounting substrate 2 includes, as illustrated in FIGS. 1 and 2, a first main surface 21 and a second main surface 22. The first main surface 21 and the second main surface 22 are opposite to each other in a thickness direction D1 of the mounting substrate 2. When the high frequency module 1 is provided on an external substrate, the second main surface 22 faces a main surface of the external substrate that is near the mounting substrate 2. The mounting substrate 2 is a double-sided mounting substrate in which the first electronic components 3, the second electronic component 4, and the third electronic components 5 are mounted on the first main surface 21 and the fourth electronic components 6 are mounted on the second main surface 22. In this embodiment, the thickness direction D1 of the mounting substrate 2 represents a first direction (hereinafter, may also be referred to as a "first direction D1").

The mounting substrate 2 is a multilayer substrate in which a plurality of dielectric layers are laminated. The mounting substrate 2 includes a plurality of conductive layers and a plurality of via conductors (including a through electrode). The plurality of conductive layers include the ground layer 24 that has the ground potential. The plurality of via conductors are used for electrical connection between elements (including the first electronic components 3, the second electronic component 4, the third electronic components 5, and the fourth electronic components 6 described above) mounted on the first main surface 21 and the second main surface 22 and the conductive layers of the mounting substrate 2. Furthermore, the plurality of via conductors are used for electrical connection between elements mounted on the first main surface 21 and elements mounted on the second main surface 22 and electrical connection between the conductive layers of the mounting substrate 2 and the external connection terminals 10.

The plurality of first electronic components 3, the second electronic component 4, and the plurality of third electronic components 5 are disposed on the first main surface 21 of the mounting substrate 2. The plurality of fourth electronic components 6 and the plurality of external connection terminals 10 are disposed on the second main surface 22 of the mounting substrate 2.

(3.2) First Electronic Components

The plurality of first electronic components 3 are, as illustrated in FIGS. 1 and 2, disposed on the first main surface 21 of the mounting substrate 2. In the example of FIG. 2, each of the first electronic components 3 is mounted on the first main surface 21 of the mounting substrate 2. Part of each of the first electronic components 3 may be mounted on the first main surface 21 of the mounting substrate 2, and the remaining part of each of the first electronic components 3 may be mounted inside the mounting substrate 2. In short, each of the first electronic components 3 is located closer to the first main surface 21 of the mounting substrate 2 than to the second main surface 22 of the mounting substrate 2 and at least part of each of the first electronic components 3 is mounted on the first main surface 21. Each of the first electronic components 3 is, for example, one of the plurality of transmission filters 121 to 123 and the plurality of reception filters 131 to 133. In FIGS. 1 and 2, illustration of the transmission filter 123 and the reception filter 133 is omitted.

Each of the plurality of transmission filters 121 to 123 and the plurality of reception filters 131 to 133 is, for example, an acoustic wave filter including a plurality of series-arm resonators and a plurality of parallel-arm resonators. The acoustic wave filter is, for example, a SAW (Surface Acoustic Wave) filter using surface acoustic waves. Furthermore, each of the plurality of transmission filters 121 to 123 and the plurality of reception filters 131 to 133 may include at least one of an inductor and a capacitor connected in series to one of a plurality of series-arm resonators or may include an inductor or a capacitor connected in series to one of a plurality of parallel-arm resonators.

(3.3) Second Electronic Component

The second electronic component 4 is, as illustrated in FIGS. 1 and 2, disposed on the first main surface 21 of the mounting substrate 2. In the example of FIG. 2, the second electronic component 4 is mounted on the first main surface 21 of the mounting substrate 2. Part of the second electronic component 4 may be mounted on the first main surface 21 of the mounting substrate 2 and the remaining part of the second electronic component 4 may be mounted inside the mounting substrate 2. In short, the second electronic component 4 is located closer to the first main surface 21 of the mounting substrate 2 than to the second main surface 22 of the mounting substrate 2 and at least part of the second electronic component 4 is mounted on the first main surface 21. The second electronic component 4 is, for example, the power amplifier 11. In the thickness direction D1 of the mounting substrate 2, a height H2 of the second electronic component 4 is higher than a height H1 of each of the first electronic components 3 (see FIG. 2).

(3.4) Third Electronic Components

The plurality of third electronic components 5 are, as illustrated in FIGS. 1 and 2, disposed on the first main surface 21 of the mounting substrate 2. In the example of FIG. 2, each of the third electronic components 5 is mounted on the first main surface 21 of the mounting substrate 2. Part of each of the third electronic components 5 may be mounted on the first main surface 21 of the mounting substrate 2 and the remaining part of each of the third electronic components 5 may be mounted inside the mounting substrate 2. In short, each of the third electronic components 5 is located closer to the first main surface 21 of the mounting substrate 2 than to the second main surface 22 of the mounting substrate 2 and at least part of each of the third electronic components 5 is mounted on the first main surface 21. Each of the third electronic components 5 is, for example, an inductor or a capacitor of the output matching circuit 15 or an inductor or a capacitor of the input matching circuit 16. In the thickness direction D1 of the mounting substrate 2, a height H3 of each of the third electronic components 5 is higher than the height H1 of each of the first electronic components 3 (see FIG. 2). By setting the height H3 of each of the third electronic components 5 to be higher than the height H1 of each of the first electronic components 3 as described above, for example, in the case where each of the third electronic components 5 is an inductor, the inductor can have a high Q value.

(3.5) Fourth Electronic Components

The plurality of fourth electronic components 6 are, as illustrated in FIG. 2, disposed on the second main surface 22 of the mounting substrate 2. In the example of FIG. 2, each of the fourth electronic components 6 is mounted on the second main surface 22 of the mounting substrate 2. Part of each of the fourth electronic components 6 may be mounted on the second main surface 22 of the mounting substrate 2 and the remaining part of each of the fourth electronic components 6 may be mounted inside the mounting substrate 2. In short, each of the fourth electronic components 6 is located closer to the second main surface 22 of the mounting substrate 2 than to the first main surface 21 of the mounting substrate 2 and at least part of each of the fourth electronic components 6 is mounted on the second main surface 22. The plurality of fourth electronic components 6 are, for example, the low noise amplifier 14 and the controller 20.

(3.6) External Connection Terminals

The plurality of external connection terminals 10 are terminals for electrically connecting the mounting substrate 2 to an external substrate.

The plurality of external connection terminals 10 are, as illustrated in FIG. 2, disposed on the second main surface 22 of the mounting substrate 2. The plurality of external connection terminals 10 are electrodes of a column shape (for example, a rectangular column shape) provided on the second main surface 22 of the mounting substrate 2. The plurality of external connection terminals 10 are made of, for example, metal (for example, copper, copper alloy, or the like). The plurality of external connection terminals 10 include the antenna terminal 101 (see FIG. 5), the signal input terminal 102 (see FIG. 5), the signal output terminal 103 (see FIG. 5), the plurality of control terminals 104 (see FIG. 5), and the plurality of ground terminals (not illustrated in the drawing). The plurality of ground terminals are electrically connected to the ground layer 24 of the mounting substrate 2. The ground layer 24 is a circuit ground of the high frequency module 1.

(3.7) First Resin Layer

The first resin layer 71 is, as illustrated in FIG. 2, disposed on the first main surface 21 of the mounting substrate 2. The first resin layer 71 covers the plurality of first electronic components 3, the second electronic component 4, and the plurality of third electronic components 5. The first resin layer 71 covers an outer peripheral surface 303 of each of the plurality of first electronic components 3, an outer peripheral surface 403 of the second electronic component 4, and an outer peripheral surface of each of the plurality of third electronic components 5. Furthermore, the first resin layer 71 covers a main surface 402 of the second electronic component 4 that is far away from the mounting substrate 2 and a main surface of each of the plurality of third electronic components 5 that is far away from the mounting substrate 2. In this embodiment, the outer peripheral surface 303 of each of the plurality of first electronic components 3 has four side surfaces that connect a main surface 302 of the first electronic component 3 that is far away from the mounting substrate 2 to a main surface 301 (a third main surface 31 in FIG. 3) of the first electronic component 3 that is near the mounting substrate 2. Furthermore, the outer peripheral surface 403 of the second electronic component 4 has four side surfaces that connect the main surface 402 of the second electronic component 4 that is far away from the mounting substrate 2 to a main surface 401 (a third main surface 41 in FIG. 4) of the second electronic component 4 that is near the mounting substrate 2. Furthermore, the outer peripheral surface of each of the plurality of third electronic components 5 has four side surfaces that connect the main surface of the third electronic component 5 that is far away from the mounting substrate 2 to a main surface of the third electronic component 5 that is near the mounting substrate 2. The first resin layer 71 includes resin (for example, epoxy resin). The resin layer 71 may include a filler as well as resin.

(3.8) Second Resin Layer

The second resin layer 72 is, as illustrated in FIG. 2, disposed on the second main surface 22 of the mounting substrate 2. The second resin layer 72 covers the plurality of fourth electronic components 6. The second resin layer 72 covers an outer peripheral surface of each of the plurality of fourth electronic components 6. Furthermore, the second resin layer 72 covers a main surface of each of the plurality of fourth electronic components 6 that is far away from the mounting substrate 2. In this embodiment, the outer peripheral surface of each of the plurality of fourth electronic components 6 has four side surfaces that connect the main surface of the fourth electronic component 6 that is far away from the mounting substrate 2 to a main surface of the fourth electronic component 6 that is near the mounting substrate 2. The second resin layer 72 includes resin (for example, epoxy resin). The second resin layer 72 may include a filler as well as resin. The second resin layer 72 may be made of the same material as the material of the first resin layer 71 or may be made of a material different from the material of the first resin layer 71.

(3.9) Metal Layer

The metal layer 8 covers, as illustrated in FIG. 2, the first resin layer 71. The metal layer 8 has conductive characteristics. In the high frequency module 1, the metal layer 8 is a shield layer provided for the purpose of electromagnetic shielding for the inside and outside of the high frequency module 1. The metal layer 8 has a multilayer structure in which a plurality of metal layers are laminated. However, the metal layer 8 does not necessarily have a multilayer structure and may include a single metal layer. The single metal layer includes one or more types of metals. The metal layer 8 covers a main surface 711 of the first resin layer 71 that is far away from the mounting substrate 2, an outer peripheral surface 713 of the first resin layer 71, an outer peripheral surface 23 of the mounting substrate 2, and part of an outer peripheral surface 723 of the second resin layer 72. Furthermore, the metal layer 8 covers the main surface 302 of each of the plurality of first electronic components 3 that is far away from the mounting substrate 2. That is, in this embodiment, the main surface 402 of the second electronic component 4 that is far away from the mounting substrate 2 is not in contact with the metal layer 8. In other words, the main surface 402 of the second electronic component 4 that is far away from the mounting substrate 2 is away from the metal layer 8 in the thickness direction D1 of the mounting substrate 2. The metal layer 8 is, as illustrated in FIG. 2, in contact with at least part of the outer peripheral surface of the ground layer 24 of the mounting substrate 2. Thus, the metal layer 8 can have the same potential as the potential of the ground layer 24. As illustrated in FIG. 2, the metal layer 8 covers a front layer (front surface) of the high frequency module 1 and is different from the ground layer 24 provided inside the mounting substrate 2.

The metal layer 8 includes, as illustrated in FIG. 2, a first part 81 and a second part 82. The first part 81 is a part that overlaps the plurality of first electronic components 3 in plan view from the thickness direction D1 of the mounting substrate 2. The second part 82 is a part that overlaps the second electronic component 4 and the plurality of third electronic components 5 in plan view from the thickness direction D1 of the mounting substrate 2. In other words, the second part 82 is a part other than the first part 81 in plan view from the thickness direction D1 of the mounting substrate 2. In the thickness direction D1 of the mounting substrate 2, a thickness t1 of the first part 81 and a thickness t2 of the second part 82 are different. More particularly, in plan view from the thickness direction D1 of the mounting substrate 2, the thickness t1 of the first part 81 is greater than the thickness t2 of the second part 82. Thus, the main surface 302 of the first electronic component 3, which has a height lower than that of the second electronic component 4 and each of the third electronic components 5, that is far away from the mounting substrate 2 can be made in contact with the metal layer 8. In the thickness direction D1 of the mounting substrate 2, a distance (height of each of the first electronic components 3) H1 from the first main surface 21 of the mounting substrate 2 to the interface between the first electronic component 3 and the first part 81 is shorter than a distance (height of each of the third electronic components 5) H3 from the first main surface 21 to the main surface of the third electronic component 5 that is far away from the mounting substrate 2.

(4) Detailed Structure of Component Elements of High Frequency Module (4.1) Mounting Substrate The mounting substrate 2 illustrated in FIGS. 1 and 2 is, for example, a multilayer substrate including a plurality of dielectric layers and a plurality of conductive layers. The plurality of dielectric layers and the plurality of conductive layers are laminated in the thickness direction D1 of the mounting substrate 2. The plurality of conductive layers are formed in predetermined patterns set for individual layers. Each of the plurality of conductive layers includes one or a plurality of conductor units on a plane orthogonal to the thickness direction D1 of the mounting substrate 2. Each of the conductive layers is made of, for example, copper. The plurality of conductive layers include the ground layer 24 (see FIG. 2). In the high frequency module 1, the plurality of ground terminals and the ground layer 24 are electrically connected with the via conductors or other components of the mounting substrate 2 interposed therebetween. The mounting substrate 2 is, for example, an LTCC (Low Temperature Co-fired Ceramics) substrate. The mounting substrate 2 is not limited to an LTCC substrate and may be, for example, a printed wiring board, an HTCC (High Temperature Co-fired Ceramics) substrate, or a resin multilayer substrate.

Furthermore, the mounting substrate 2 is not limited to an LTCC substrate and may be, for example, a wiring structural body. The wiring structural body is, for example, a multilayer structural body. The multilayer structural body includes at least one insulating layer and at least one conductive layer. The insulating layer is formed in a predetermined pattern. In the case where a plurality of insulating layers are provided, the plurality of insulating layers are formed in predetermined patterns set for individual layers. The conductive layer is formed in a predetermined pattern different from the predetermined pattern of the insulating layer. In the case where a plurality of conductive layers are provided, the plurality of conductive layers are formed in predetermined patterns set for individual layers. The conductive layer may include one or a plurality of redistribution parts. In the wiring structural body, a first surface, out of two surfaces that are opposite to each other in the thickness direction of the multilayer structural body, corresponds to the first main surface 21 of the mounting substrate 2, and a second surface out of the two surfaces corresponds to the second main surface 22 of the mounting substrate 2. The wiring structural body may be, for example, an interposer. The interposer may be an interposer including a silicon substrate or may be a substrate including multiple layers.

The first main surface 21 and the second main surface 22 of the mounting substrate 2 are away from each other in the thickness direction D1 of the mounting substrate 2 and intersect with the thickness direction D1 of the mounting substrate 2. For example, the first main surface 21 of the mounting substrate 2 is orthogonal to the thickness direction D1 of the mounting substrate 2. However, the first main surface 21 may include, for example, a side surface of a conductor unit as a surface that is not orthogonal to the thickness direction D1 of the mounting substrate 2. Furthermore, for example, the second main surface 22 of the mounting substrate 2 is orthogonal to the thickness direction D1 of the mounting substrate 2. However, the second main surface 22 may include, for example, a side surface of a conductor unit as a surface that is not orthogonal to the thickness direction D1 of the mounting substrate 2. Furthermore, fine roughnesses, recesses, or protrusions may be formed in the first main surface 21 and the second main surface 22 of the mounting substrate 2.

(4.2) Filters

The detailed structure of the plurality of transmission filters 121 to 123 and the plurality of reception filters 131 to 133 illustrated in FIG. 5 will be described. Hereinafter, the transmission filters 121 to 123 and the reception filters 131 to 133 will be referred to as filters without necessarily being distinguished from one another.

Figure 3:
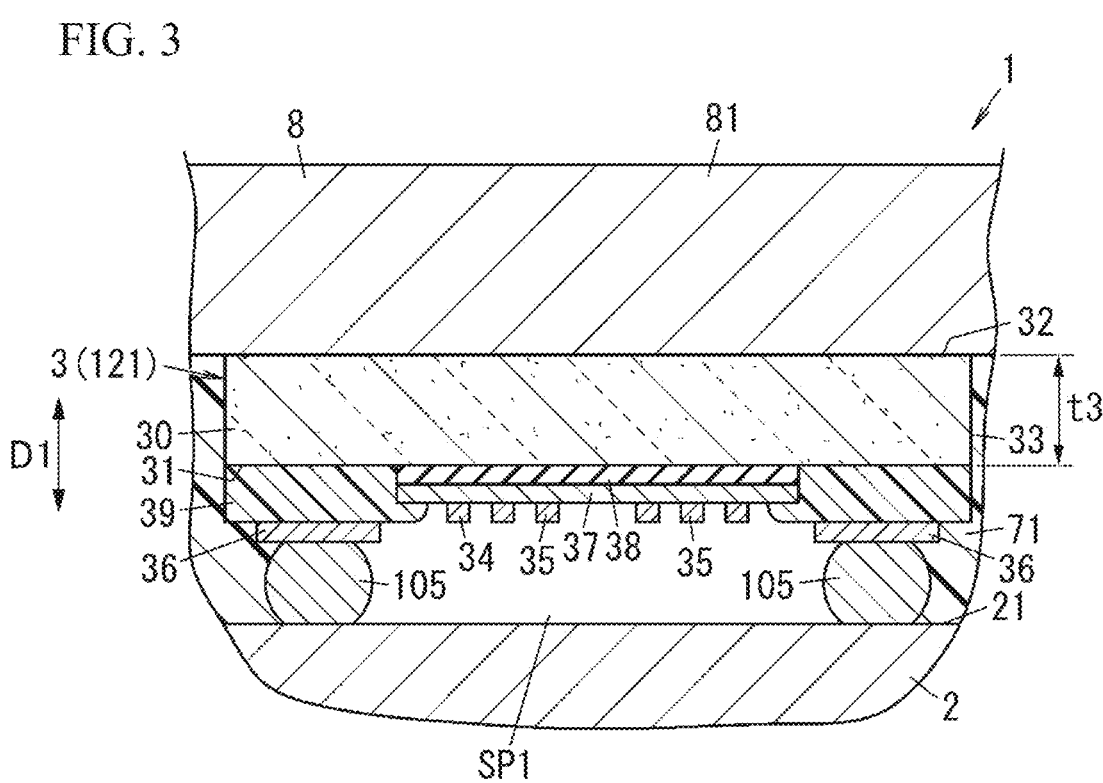
FIG. 3 is a main section enlarged view of the high frequency module.

A filter as a first electronic component 3 is a bare-chip acoustic wave filter. As illustrated in FIG. 3, the first electronic component 3 includes a substrate 30, a circuit unit 34, a plurality of pad electrodes 36, a piezoelectric layer 37, and a low acoustic velocity film 38. The substrate 30 has a third main surface 31 and a fourth main surface 32 that are opposite to each other in a thickness direction of the substrate 30. The circuit unit 34 includes a plurality of IDT (Interdigital Transducer) electrodes 35. The plurality of pad electrodes 36 are formed on the third main surface 31 of the substrate 30 and are connected to the circuit unit 34. The plurality of pad electrodes 36 are connected to the mounting substrate 2 with a plurality of bumps 105 interposed therebetween. The low acoustic velocity film 38 is provided on the third main surface 31 of the substrate 30. The piezoelectric layer 37 is provided on the low acoustic velocity film 38. The plurality of IDT electrodes 35 are provided on the piezoelectric layer 37. Furthermore, the plurality of IDT electrodes 35 are arranged in a space SP1 formed, between the substrate 30 and the mounting substrate 2, by the plurality of pad electrodes 36, the plurality of bumps 105, the substrate 30, the mounting substrate 2, and the first resin layer 71. The first electronic component 3 has a rectangular shape in plan view from the thickness direction of the substrate 30. For example, the first electronic component 3 may have a square shape.

The low acoustic velocity film 38 is positioned away from the outer periphery of the substrate 30 in plan view from the thickness direction of substrate 30. The first electronic component 3 further includes an insulating layer 39. The insulating layer 39 covers a region of the third main surface 31 of the substrate 30 that is not covered with the low acoustic velocity film 38. The insulating layer 39 has electrical insulating characteristics. The insulating layer 39 is formed along the outer periphery of the substrate 30 on the third main surface 31 of the substrate 30. The insulating layer 39 surrounds the plurality of IDT electrodes 35. The insulating layer 39 has a frame shape (for example, a rectangular frame shape) in plan view from the thickness direction of the first electronic component 3. Part of the insulating layer 39 overlaps an outer peripheral part of the piezoelectric layer 37 in the thickness direction of the first electronic component 3. The outer peripheral surface of the piezoelectric layer 37 and the outer peripheral surface of the low acoustic velocity film 38 are covered with the insulating layer 39. The insulating layer 39 is made of epoxy resin, polyimide, or the like.

The plurality of pad electrodes 36 are provided on the third main surface 31 of the substrate 30 with the insulating layer 39 interposed therebetween.

The piezoelectric layer 37 is made of, for example, lithium niobate or lithium tantalate. The low acoustic velocity film 38 is made of, for example, silicon oxide. The acoustic velocity of bulk waves propagating in the low acoustic velocity film 38 is lower than the acoustic velocity of bulk waves propagating in the piezoelectric layer 37. The low acoustic velocity film 38 is not necessarily made of silicon oxide and may be made of, for example, silicon oxide, glass, silicon oxynitride, tantalum oxide, a compound obtained by adding fluorine, carbon, or boron to silicon oxide, or a material containing a material mentioned above as a main component.

The substrate 30 is, for example, a silicon substrate. That is, a material of the substrate 30 of the first electronic component 3 is silicon. The acoustic velocity of bulk waves propagating in the substrate 30 is higher than the acoustic velocity of acoustic waves propagating in the piezoelectric layer 37. A bulk wave propagating in the substrate 30 is a bulk wave of the lowest acoustic velocity among a plurality of bulk waves propagating in the substrate 30. In this embodiment, the substrate 30 and the low acoustic velocity film 38 provided on the substrate 30 configure a high acoustic velocity member. Furthermore, in this embodiment, the substrate 30 is a supporting substrate made of a silicon substrate. The substrate 30 is not necessarily made of silicon. The substrate 30 may be made of, for example, a material containing any of gallium arsenide, aluminum arsenide, indium arsenide, indium phosphide, gallium phosphide, indium antimonide, gallium nitride, indium nitride, aluminum nitride, silicon, germanium, silicon carbide, and gallium (III) oxide as a main component or a material containing a multicomponent mixed crystal material made up of two or more materials out of the above-described materials as a main component.

The first electronic component 3 as a filter may further include a high acoustic velocity film provided between the substrate 30 and the low acoustic velocity film 38. The acoustic velocity of bulk waves propagating in the high acoustic velocity film is higher than the acoustic velocity of acoustic waves propagating in the piezoelectric layer 37. The high acoustic velocity film is made of, for example, silicon nitride. However, the high acoustic velocity film is not necessarily made of silicon nitride and may be made of, for example, a material of at least one type selected from a group including diamond-like carbon, aluminum nitride, aluminum oxide, silicon carbide, silicon nitride, silicon, sapphire, lithium tantalate, lithium niobate, quartz, zirconia, cordierite, mullite, steatite, forsterite, magnesia, and diamond.

Furthermore, the first electronic component 3 as a filter may include, for example, a close contact layer interposed between the low acoustic velocity film 38 and the piezoelectric layer 37. The close contact layer is made of, for example, resin (epoxy resin or polyimide resin). The first electronic component 3 as a filter may include a dielectric film between the low acoustic velocity film 38 and the piezoelectric layer 37, above the piezoelectric layer 37, or below the low acoustic velocity film 38.

(4.3) Power Amplifier

Figure 4:
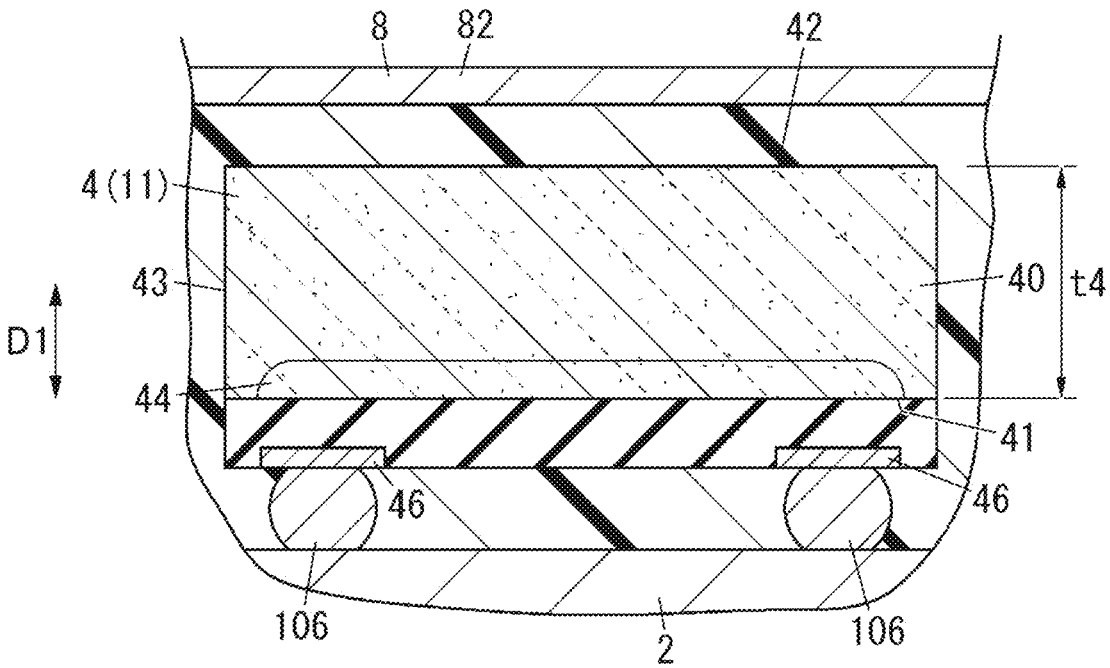
FIG. 4 is another main section enlarged view of the high frequency module.

The second electronic component 4 as the power amplifier 11 is, as illustrated in FIG. 4, for example, a one-chip IC including a substrate 40 and a circuit unit 44. The substrate 40 has a third main surface 41 and a fourth main surface 42 that are opposite to each other in a thickness direction of the substrate 40. The substrate 40 is, for example, a gallium arsenide substrate. That is, a material of the substrate 40 of the second electronic component 4 is gallium arsenide. The circuit unit 44 includes at least one transistor formed on the third main surface 41 of the substrate 40. The circuit unit 44 has a function for amplifying a transmission signal input to the input terminal of the power amplifier 11. The transistor is, for example, an HBT (Heterojunction Bipolar Transistor). The power amplifier 11 may include, for example, a DC cut capacitor. The IC chip as the power amplifier 11 is, for example, flip-chip mounted on the first main surface 21 of the mounting substrate 2 in such a manner that the third main surface 41 of the substrate 40 is near the first main surface 21 of the mounting substrate 2. The outer edge of the power amplifier 11 has a quadrilateral shape in plan view from the thickness direction D1 of the mounting substrate 2. A thickness t4 of the substrate 40 of the second electronic component 4 (see FIG. 4) is greater than a thickness t3 of the substrate 30 of each of the first electronic components 3 (see FIG. 3). As a result, the height H2 of the second electronic component 4 (see FIG. 2) is higher than the height H1 of the first electronic component 3 (see FIG. 2). The second electronic component 4 further includes a plurality of pad electrodes 46. The plurality of pad electrodes 46 are mounted on the mounting substrate 2 with a plurality of bumps 106 interposed therebetween.

As described above, a material of the substrate 30 of each of the first electronic components 3 is silicon, and a material of the substrate 40 of the second electronic component 4 is gallium arsenide. Thus, the hardness of the substrate 30 of the first electronic component 3 is higher than the hardness of the substrate 40 of the second electronic component 4. A scale indicating "hardness" is, for example, Vickers hardness. "A is harder than B" represents, for example, the value of Vickers hardness of A is greater than the value of Vickers hardness of B. In the example described above, the value of Vickers hardness of silicon, which is the material of the substrate 30, is greater than the value of Vickers hardness of gallium arsenide, which is the material of the substrate 40. In this case, the substrate 40 of the second electronic component 4 is more brittle (weak strength) than the substrate 30 of the first electronic component 3, and it is difficult to make the substrate 40 of the second electronic component 4 thin. Thus, for easier processing, it is desirable that the substrate 40 have a large thickness.

The substrate 40 is not necessarily made of gallium arsenide. The substrate 40 may be made of, for example, a material containing any of gallium arsenide, aluminum arsenide, indium arsenide, indium phosphide, gallium phosphide, indium antimonide, gallium nitride, indium nitride, aluminum nitride, silicon, germanium, silicon germanium, silicon carbide, gallium (III) oxide, and gallium bismuth as a main component or a material containing a multicomponent mixed crystal material made up of two or more materials out of the above-described materials as a main component.

(4.4) Low Noise Amplifier

The fourth electronic component 6 as the low noise amplifier 14 is, for example, a one-chip IC including a substrate and a circuit unit. The substrate has a first surface and a second surface that are opposite to each other. The substrate is, for example, a silicon substrate. The circuit unit is formed on the first surface of the substrate. The circuit unit has a function for amplifying a reception signal input to the input terminal of the low noise amplifier 14. The IC chip as the low noise amplifier 14 is, for example, flip-chip mounted on the second main surface 22 of the mounting substrate 2 in such a manner that the first surface of the substrate is near the second main surface 22 of the mounting substrate 2. The outer edge of the low noise amplifier 14 has a quadrilateral shape in plan view from the thickness direction D1 of the mounting substrate 2.

(4.5) Third Electronic Components

Each of the plurality of third electronic components 5 is, for example, a chip component configuring an inductor or a capacitor of the output matching circuit 15 or an inductor or a capacitor of the input matching circuit 16. Each of the plurality of third electronic components 5 is an SMD (Surface Mount Device). Each of the plurality of third electronic components 5 has a cuboid shape. The outer edge of each of the plurality of third electronic components 5 has a quadrilateral shape in plan view from the thickness direction D1 of the mounting substrate 2.

(4.6) Controller

The fourth electronic component 6 as the controller 20 is, for example, a one-chip IC including a substrate and a circuit unit. The substrate has a first surface and a second surface that are opposite to each other. The substrate is, for example, a silicon substrate. The circuit unit includes a control circuit that controls the power amplifier 11 in accordance with a control signal from the signal processing circuit 92. The controller 20 is, for example, flip-chip mounted on the second main surface 22 of the mounting substrate 2 in such a manner that the first surface of the substrate is near the second main surface 22 of the mounting substrate 2. The outer edge of the controller 20 has a quadrilateral shape in plan view from the thickness direction D1 of the mounting substrate 2.

(5) Communication Apparatus

The communication apparatus 9 includes, as illustrated in FIG. 5, the high frequency module 1, the antenna 91, and the signal processing circuit 92.

(5.1) Antenna

The antenna 91 is connected to the antenna terminal 101 of the high frequency module 1. The antenna 91 has a transmission function for radiating, as a radio wave, a transmission signal output from the high frequency module 1 and a reception function for receiving a reception signal as a radio wave from the outside and outputting the received reception signal to the high frequency module 1.

(5.2) Signal Processing Circuit

The signal processing circuit 92 includes the RF signal processing circuit 93 and a baseband signal processing circuit 94. The signal processing circuit 92 processes signals passing through the high frequency module 1. More particularly, the signal processing circuit 92 processes transmission signals and reception signals.

The RF signal processing circuit 93 is, for example, an RFIC (Radio Frequency Integrated Circuit). The RF signal processing circuit 93 performs signal processing for high frequency signals.

The RF signal processing circuit 93 performs signal processing such as up-conversion for a high frequency signal output from the baseband signal processing circuit 94, and outputs the high frequency signal on which signal processing has been performed to the high frequency module 1. Specifically, the RF signal processing circuit 93 performs signal processing such as up-conversion for a transmission signal output from the baseband signal processing circuit 94, and outputs the transmission signal on which signal processing has been performed to the transmission path T1 of the high frequency module 1.

The RF signal processing circuit 93 performs signal processing such as down-conversion for a high frequency signal output from the high frequency module 1, and outputs the high frequency signal on which signal processing has been performed to the baseband signal processing circuit 94. Specifically, the RF signal processing circuit 93 performs signal processing for a reception signal output from the reception path R1 of the high frequency module 1, and outputs the reception signal on which signal processing has been performed to the baseband signal processing circuit 94.

The baseband signal processing circuit 94 is, for example, a BBIC (Baseband Integrated Circuit). The baseband signal processing circuit 94 performs predetermined signal processing for a transmission signal from the outside of the signal processing circuit 92. A reception signal processed at the baseband signal processing circuit 94 is, for example, used as an image signal for image display or used as an audio signal for conversation.

Furthermore, the RF signal processing circuit 93 also has a function as a controller that controls connection of each of the first switch 17, the second switch 18, and the third switch 19 provided in the high frequency module 1, on the basis of transmission and reception of high frequency signals (transmission signals and reception signals). Specifically, the RF signal processing circuit 93 performs switching of connection of each of the first switch 17, the second switch 18, and the third switch 19 of the high frequency module 1 in accordance with control signals (not illustrated in the drawing). The controller may be provided outside the RF signal processing circuit 93 and may be, for example, provided at the high frequency module 1 or the baseband signal processing circuit 94.

(6) Details of Metal Layer

Details of the metal layer 8 will be described below with reference to drawings.

As described above, the metal layer 8 covers the main surface 711 of the first resin layer 71 that is far away from the mounting substrate 2, the outer peripheral surface 713 of the first resin layer 71, the outer peripheral surface 23 of the mounting substrate 2, and part of the outer peripheral surface 723 of the second resin layer 72. Furthermore, the metal layer 8 covers the main surface 302 of each of the plurality of first electronic components 3 that is far away from the mounting substrate 2. In the high frequency module 1 according to the first embodiment, the main surface 302 of each of the plurality of first electronic components 3 that is far away from the mounting substrate 2 is in contact with the metal layer 8. Thus, in the high frequency module 1 according to the first embodiment, heat generated at each of the plurality of first electronic components 3 can be dissipated to the outside through the metal layer 8. For example, heat generated at each of the plurality of first electronic components 3 can be dissipated to an external substrate through the metal layer 8, the ground layer 24 of the mounting substrate 2, the via conductors of the mounting substrate 2 (not illustrated in drawings), and the external connection terminals 10.

In the high frequency module 1 according to the first embodiment, as illustrated in FIG. 2, the metal layer 8 includes the first part 81 and the second part 82. The first part 81 is a part that overlaps the plurality of first electronic components 3 in plan view from the thickness direction D1 of the mounting substrate 2. The second part 82 is a part that overlaps at least the second electronic component 4 in plan view from the thickness direction D1 of the mounting substrate 2. In the high frequency module 1 according to the first embodiment, the second part 82 is a part that overlaps the second electronic component 4 and the plurality of third electronic components 5 in plan view from the thickness direction D1 of the mounting substrate 2. In other words, the second part 82 is a part other than the first part 81 in plan view from the thickness direction D1 of the mounting substrate 2.

Furthermore, in the high frequency module 1 according to the first embodiment, as illustrated in FIG. 2, the thickness t1 of the first part 81 is greater than the thickness t2 of the second part 82 in the thickness direction D1 of the mounting substrate 2. Thus, the main surface 302 of each of the first electronic components 3, which has a height lower than that of the second electronic component 4, that is far away from the mounting substrate 2 can be made in contact with the metal layer 8. Furthermore, the second electronic component 4 and the third electronic components 5, each of which has a height higher than that of each of the first electronic components 3, can be disposed in a region that overlaps the second part 82 in the thickness direction D1 of the mounting substrate 2.

Furthermore, in the high frequency module 1 according to this embodiment, as illustrated in FIG. 2, the plurality of first electronic components 3 are disposed between the second electronic component 4 and the third electronic components 5 in a direction D2 (hereinafter, may also be referred to as a "second direction D2") that intersects with (is orthogonal to) the thickness direction D1 of the mounting substrate 2. That is, the first part 81 of the metal layer 8 that is in contact with the main surface 302 of each of the first electronic components 3 that is far away from the mounting substrate 2 is positioned between the second electronic component 4 and the third electronic components 5 in the second direction D2. As described above, (the first part 81 of) the metal layer 8 to which the ground potential is applied is arranged between the second electronic component 4 and the third electronic components 5. Thus, the isolation between the second electronic component 4 and the third electronic components 5 can be improved.

In the high frequency module 1 according to the first embodiment, the main surface 402 of the second electronic component 4 that is far away from the mounting substrate 2 is not in contact with the metal layer 8. In other words, the main surface 402 of the second electronic component 4 that is far away from the mounting substrate 2 is positioned away from (the second part 82 of) the metal layer 8 in the thickness direction D1 of the mounting substrate 2. To make the main surface 402 of the second electronic component 4 in contact with the metal layer 8, an operation for polishing a resin material layer 70 (see FIG. 6) from which the first resin layer 71 is to be made and the second electronic component 4 so that the main surface 402 of the second electronic component 4 is exposed needs to be performed. However, since the substrate 40 of the second electronic component 4 is a gallium arsenide substrate as described above, the work efficiency may deteriorate. Thus, in the high frequency module 1 according to the first embodiment, as illustrated in FIG. 2, the main surface 402 of the second electronic component 4 that is far away from the mounting substrate 2 is not in contact with the metal layer 8. Accordingly, deterioration in the work efficiency can be suppressed.

(7) Method for Manufacturing High Frequency Module

Next, a method for manufacturing the high frequency module 1 according to the first embodiment will be described with reference to FIG. 2 and FIGS. 6 to 8.

The method for manufacturing the high frequency module 1 includes, for example, a first step, a second step, a third step, a fourth step, a fifth step, a sixth step, and a seventh step.

Figure 6:
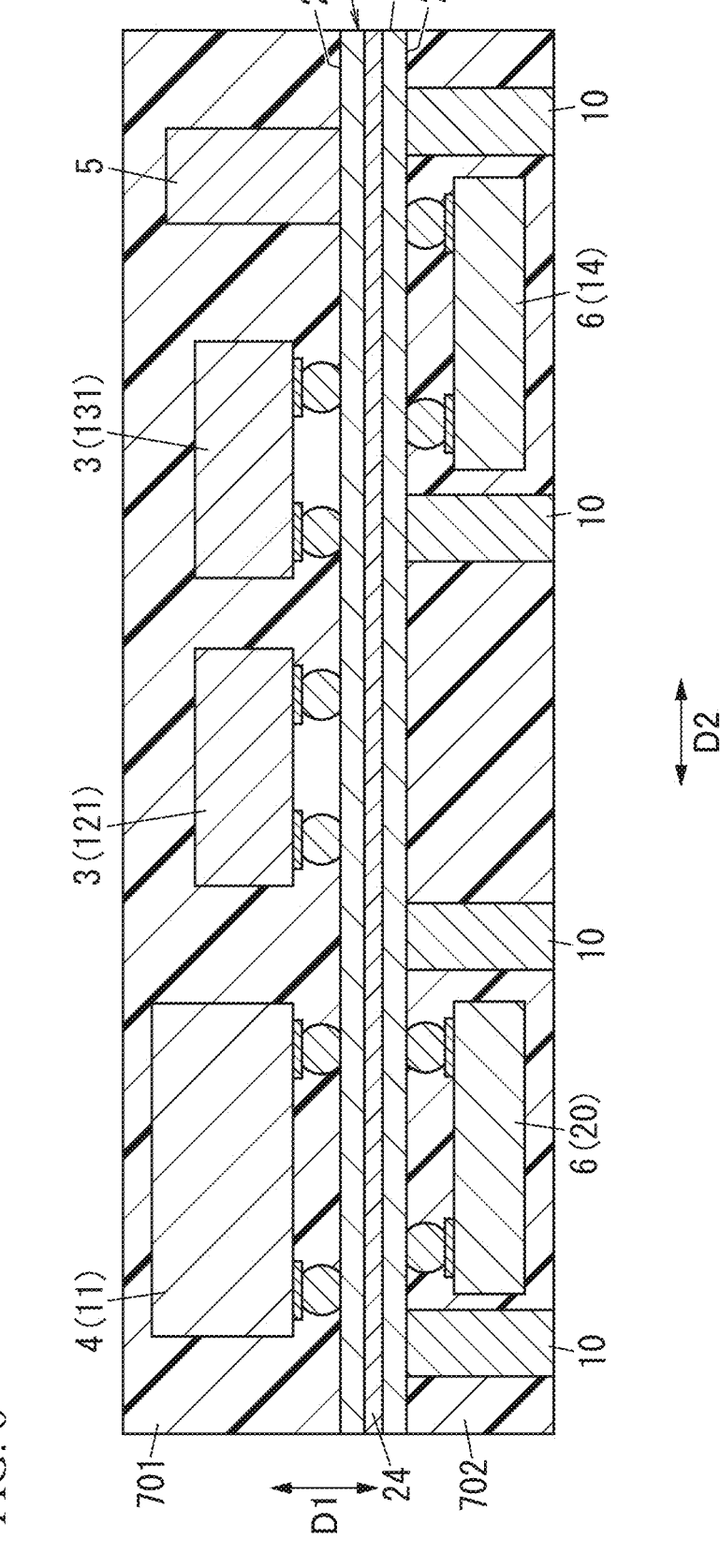
FIG. 6 is a cross-section view illustrating a first forming step of a method for manufacturing the high frequency module.

The first step is a step of disposing the plurality of first electronic components 3, the second electronic component 4, and the plurality of third electronic components 5 on the first main surface 21 of the mounting substrate 2. More particularly, in the first step, as illustrated in FIG. 6, the plurality of first electronic components 3, the second electronic component 4, and the plurality of third electronic components 5 are mounted on the first main surface 21 of the mounting substrate 2. The second step is a step of disposing the plurality of fourth electronic components 6 on the second main surface 22 of the mounting substrate 2. More particularly, in the second step, the plurality of fourth electronic components 6 are mounted on the second main surface 22 of the mounting substrate 2.

The third step is a step of forming the first resin member (resin member) 701 from which the first resin layer 71 is to be made near the first main surface 21 of the mounting substrate 2. More particularly, in the third step, as illustrated in FIG. 6, the first resin member 701 is formed near the first main surface 21 of the mounting substrate 2 in such a manner that the first resin member 701 covers the plurality of first electronic components 3, the second electronic component 4, and the plurality of third electronic components 5. The fourth step is a step of forming a second resin member 702 from which the second resin layer 72 is to be made near the second main surface 22 of the mounting substrate 2. More particularly, in the fourth step, as illustrated in FIG. 6, the second resin member 702 is formed near the second main surface 22 of the mounting substrate 2 in such a manner that the second resin member 702 covers the plurality of fourth electronic components 6.

Figure 7:
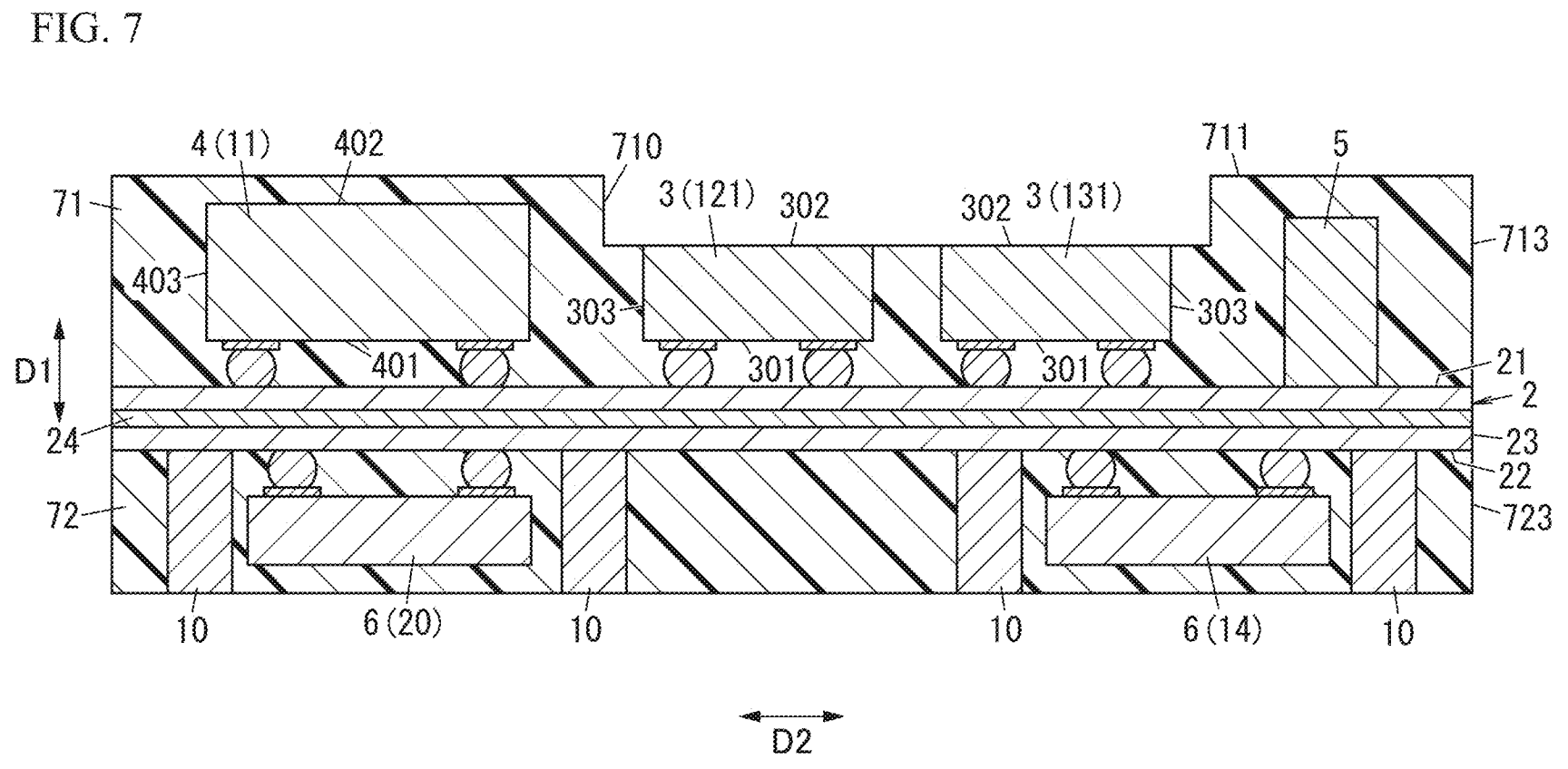

The fifth step is a step of forming a recessed part 710, for example, by using a polishing machine. More particularly, in the fifth step, as illustrated in FIG. 7, the recessed part 710 is formed in a region of the first resin member 701 (see FIG. 6) that overlaps the plurality of first electronic components 3 in the thickness direction D1 of the mounting substrate 2. Thus, the first resin layer 71 including the recessed part 710 is formed. In the state in which the recessed part 710 is formed, the main surface 302 of each of the plurality of first electronic components 3 that is far away from the mounting substrate 2 is exposed.

Figure 8:
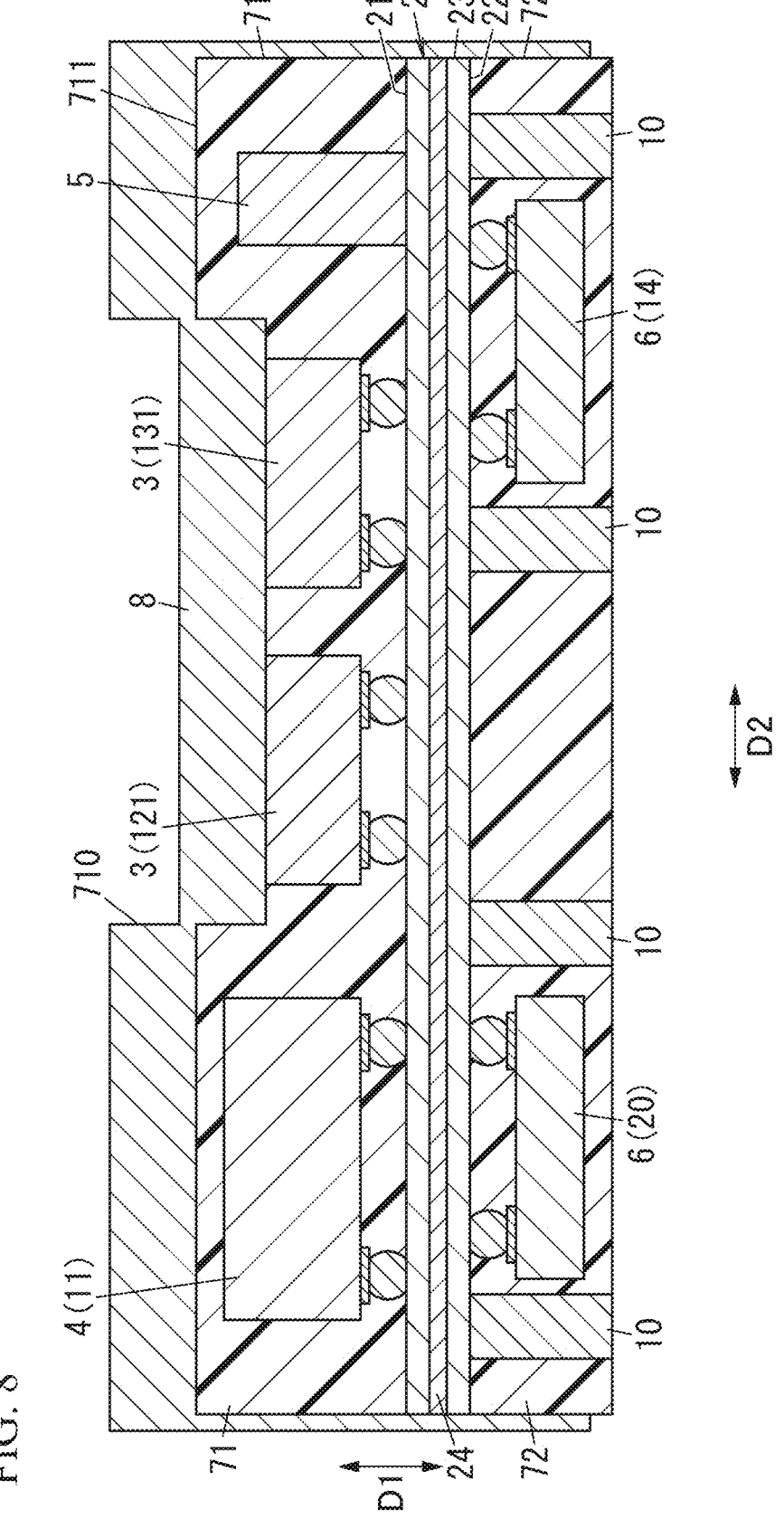
FIG. 8 is a cross-section view illustrating a third forming step of the method for manufacturing the high frequency module.

The sixth step is a step of forming the metal layer 8, for example, by sputtering, vapor deposition, or printing. More particularly, in the sixth step, as illustrated in FIG. 8, the metal layer 8 that is in contact with the main surface 711 of the first resin layer 71 that is far away from the mounting substrate 2, the outer peripheral surface 713 of the first resin layer 71, the outer peripheral surface 23 of the mounting substrate 2, part of the outer peripheral surface 723 of the second resin layer 72, and an inner peripheral surface of the recessed part 710 is formed. In the seventh step, as illustrated in FIG. 2, a surface of the metal layer 8 is polished by using a polishing machine in such a manner that the surface of the metal layer 8 that is far away from the mounting substrate 2 becomes uniform.

The high frequency module 1 illustrated in FIG. 2 can be manufactured by the first to seventh steps described above.

In the method for manufacturing the high frequency module 1 according to the first embodiment, the third step is a first forming step of forming the first resin member 701 on the first main surface 21 of the mounting substrate 2. Furthermore, in the method for manufacturing the high frequency module 1 according to the first embodiment, the fifth step is a second forming step of forming the first resin layer 71 that has the recessed part 710. Furthermore, in the method for manufacturing the high frequency module 1 according to the first embodiment, the sixth step and the seventh step form a third forming step of forming the metal layer 8 having the ground potential. In short, the method for manufacturing the high frequency module 1 according to the first embodiment includes the first forming step, the second forming step, and the third forming step. The first forming step is a step of forming the first resin member 701 on the first main surface 21 of the mounting substrate 2 in such a manner that the first resin member 701 covers the first electronic components 3 and the second electronic component 4 that are disposed on the first main surface 21 of the mounting substrate 2. The mounting substrate 2 has the first main surface 21 and the second main surface 22 that are opposite to each other. The height of the second electronic component 4 is higher than the height of each of the first electronic components 3 in the thickness direction D1 of the mounting substrate 2. The second forming step is a step of forming the first resin layer 71 that has the recessed part 710 in such a manner that the main surface 302 of the first electronic component 3 that is far away from the mounting substrate 2 is exposed. The third forming step is a step of forming the metal layer 8 that has the ground potential in such a manner that the metal layer 8 covers the main surface 711 of the first resin layer 71 that is far away from the mounting substrate 2.

(8) Effects

In the high frequency module 1 according to the first embodiment, the height H1 of each of the first electronic components 3 is lower than the height H2 of the second electronic component 4, and the main surface 302 of each of the first electronic components 3 that is near the mounting substrate 2 is in contact with the metal layer 8. That is, the metal layer 8 is formed to be in contact with each of the first electronic components 3 that is lower than the second electronic component 4. Thus, the substrate 30 of each of the first electronic components 3 does not need to be formed thick, and an increase in the cost can be suppressed compared to the case where the substrate 30 of each of the first electronic components 3 is formed thick.

Furthermore, as described above, in the high frequency module 1 according to the first embodiment, the main surface 302 of each of the plurality of first electronic components 3 that is far away from the mounting substrate 2 is in contact with the metal layer 8. Thus, heat generated at each of the plurality of first electronic components 3 can be dissipated through the metal layer 8. That is, in the high frequency module 1 according to the first embodiment, the heat dissipation characteristics of the first electronic component 3 can be improved without necessarily the thickness t3 of the substrate 30 of the first electronic component 3 being unnecessarily increased.

Furthermore, in the high frequency module 1 according to the first embodiment, only a part of the first resin layer 71 that faces the first electronic components 3 in the thickness direction D1 of the mounting substrate 2 is polished. Thus, the work efficiency can be improved compared to the case where the entire first resin layer 71 is polished.

Furthermore, in the high frequency module 1 according to the first embodiment, as described above, the thickness t1 of the first part 81 of the metal layer 8 is greater than the thickness t2 of the second part 82 of the metal layer 8. Thus, the second electronic component 4 and the third electronic components 5, each of which has a height higher than that of each of the first electronic components 3, can be disposed in a region that overlaps the second part 82 in the thickness direction D1 of the mounting substrate 2. In particular, in the case where the third electronic components 5 are inductors, the inductors can have high Q values.

Furthermore, in the high frequency module 1 according to the first embodiment, as described above, the plurality of first electronic components 3 that overlap the first part 81 of the metal layer 8 in the thickness direction D1 of the mounting substrate 2 are disposed between the second electronic component 4 and the third electronic components 5 in the direction D2 that intersects with the thickness direction D1 of the mounting substrate 2. Furthermore, the ground potential is applied to the metal layer 8. Thus, the isolation between the second electronic component 4 and the third electronic components 5 can be improved.

Furthermore, in the high frequency module 1 according to the first embodiment, as described above, the thickness t4 of the substrate 40 of the second electronic component 4 is greater than the thickness t3 of the substrate 30 of each of the first electronic components 3. Furthermore, as described above, a material of the substrate 40 is gallium arsenide. Since the thickness t4 of the substrate 40 whose strength is weak and which is difficult to make thin is made large as described above, the substrate 40 can be easily processed. As a result, processing accuracy of the substrate 40 can be improved, and the reliability of the second electronic component 4 can be improved.

Second Embodiment

A high frequency module 1a according to the second embodiment will be described with reference to FIG. 9. Components of the high frequency module 1a according to the second embodiment that are similar to those of the high frequency module 1 according to the first embodiment will be denoted by the same signs and description of those similar components will be omitted.

Figure 9:
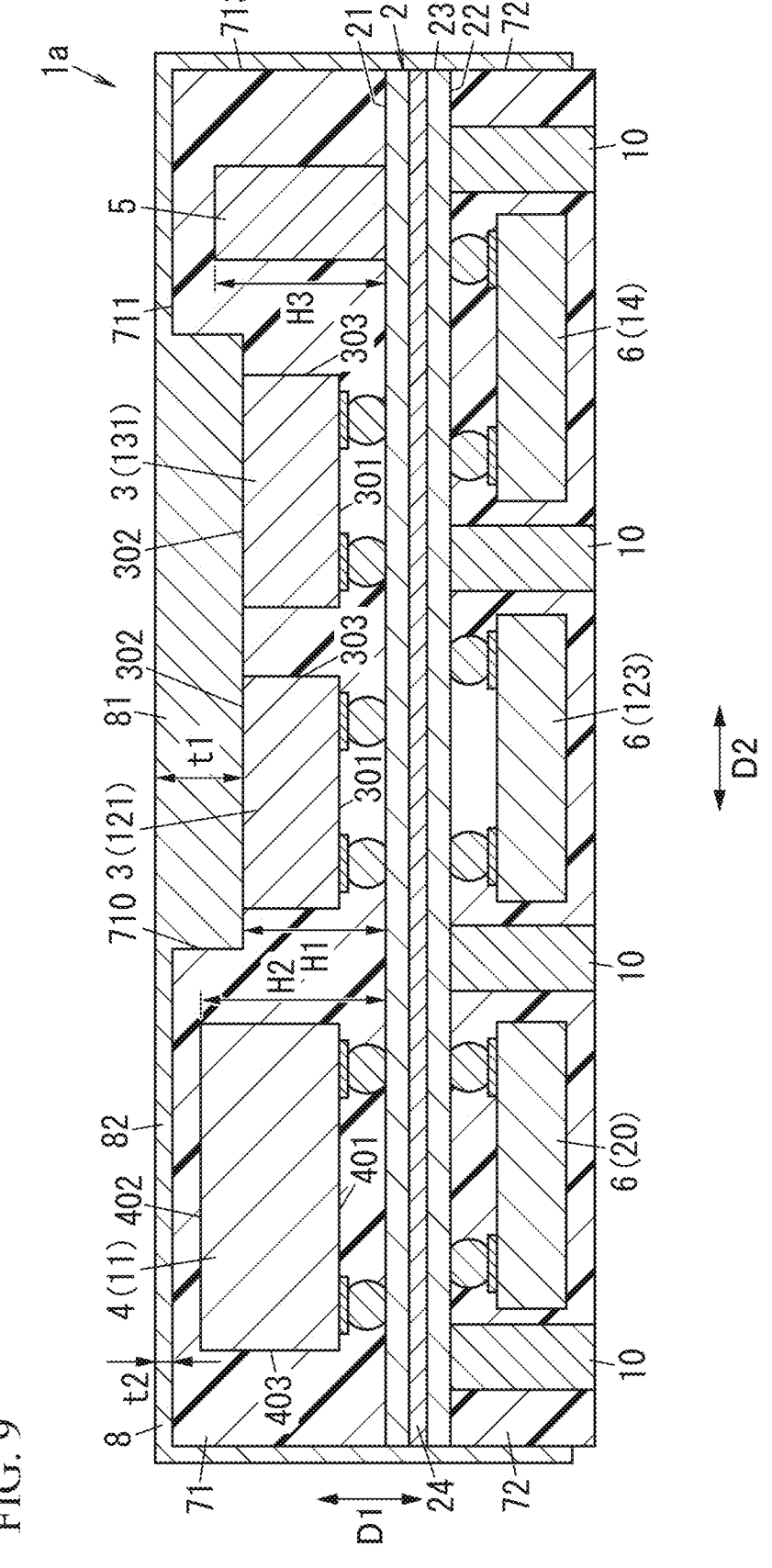
FIG. 9 is a cross-section view of a high frequency module according to a second embodiment.

The high frequency module 1a according to the second embodiment is different from the high frequency module 1 according to the first embodiment (see FIG. 2) in that three fourth electronic components 6 are disposed on the second main surface 22 of the mounting substrate 2, as illustrated in FIG. 9.

The high frequency module 1a according to the second embodiment includes, as illustrated in FIG. 9, the mounting substrate 2, the plurality of first electronic components 3, the second electronic component 4, the plurality of third electronic components 5 (in FIG. 9, only one third electronic component 5 is illustrated), the plurality of (in the example illustrated in the drawing, three) fourth electronic components 6, and the plurality of external connection terminals 10. The high frequency module 1a according to the second embodiment further includes the first resin layer 71, the second resin layer 72, and the metal layer 8.

The three fourth electronic components 6 are disposed on the second main surface 22 of the mounting substrate 2. More particularly, the three fourth electronic components 6 are arranged along the direction D2 that intersects with the thickness direction D1 of the mounting substrate 2. The three fourth electronic components 6 are, for example, the low noise amplifier 14, the controller 20, and the transmission filter 123.

As in the high frequency module 1 according to the first embodiment, the height H1 of each of the first electronic components 3 is lower than the height H2 of the second electronic component 4 and the main surface 302 of each of the first electronic components 3 that is near the mounting substrate 2 is in contact with the metal layer 8 in the high frequency module 1a according to the second embodiment. Thus, the substrate 30 of each of the first electronic components 3 does not need to be formed thick, and an increase in the cost can be suppressed compared to the case where the substrate 30 of each of the first electronic components 3 is formed thick.

Third Embodiment

A high frequency module 1b according to the third embodiment will be described with reference to FIG. 10. Components of the high frequency module 1b according to the third embodiment that are similar to those of the high frequency module 1 according to the first embodiment will be denoted by the same signs, and description of those similar components will be omitted.

Figure 10:
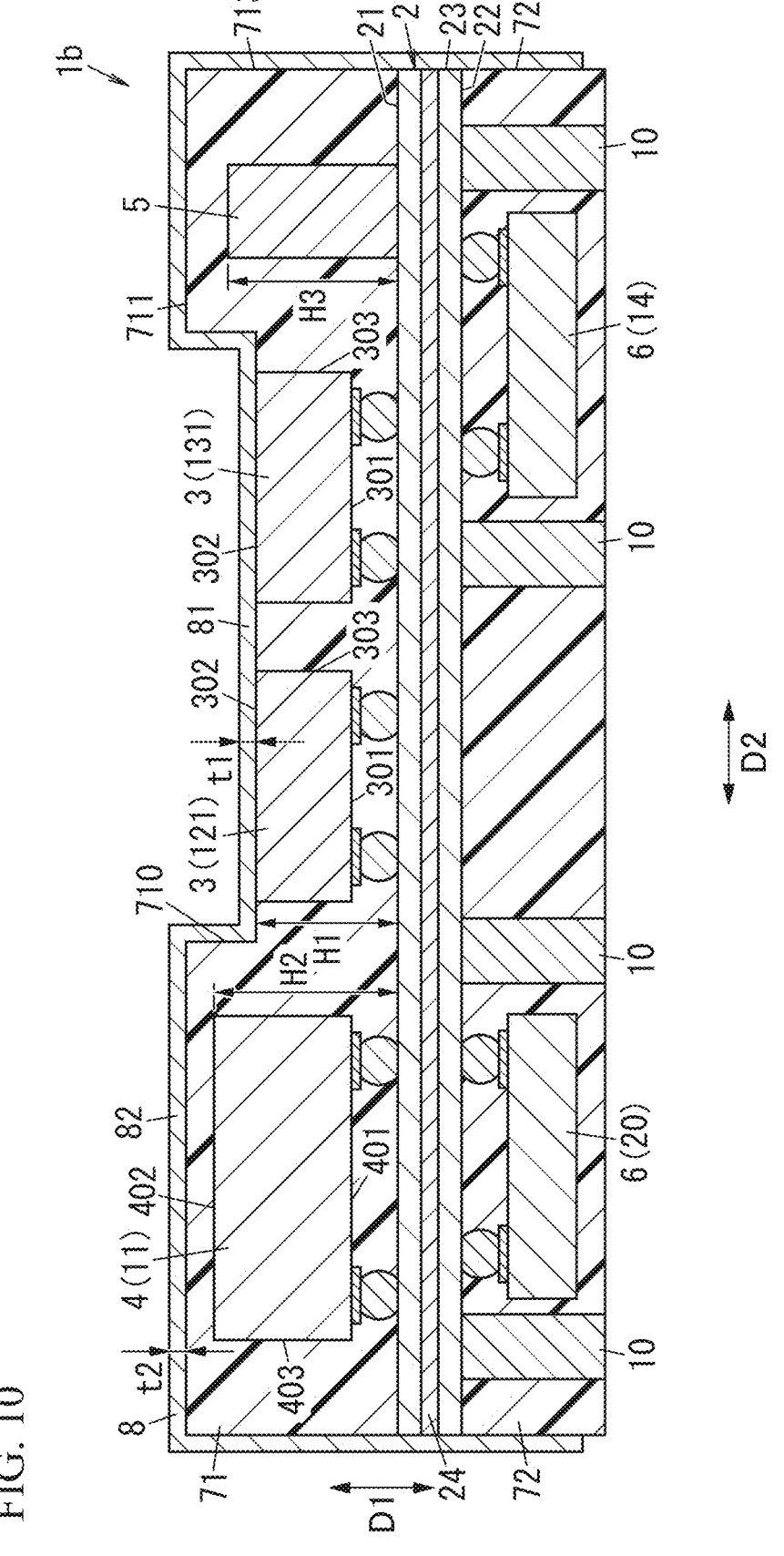
FIG. 10 is a cross-section view of a high frequency module according to a third embodiment.

The high frequency module 1b according to the third embodiment is different from the high frequency module 1 according to the first embodiment (see FIG. 2) in that the thickness t1 of the first part 81 of the metal layer 8 and the thickness t2 of the second part 82 of the metal layer 8 are the same, as illustrated in FIG. 10.

The high frequency module 1b according to the third embodiment includes, as illustrated in FIG. 10, the mounting substrate 2, the plurality of first electronic components 3, the second electronic component 4, the plurality of third electronic components 5, the plurality of fourth electronic components 6, and the plurality of external connection terminals 10. The high frequency module 1b according to the third embodiment further includes the first resin layer 71, the second resin layer 72, and the metal layer 8.

The metal layer 8 includes, as illustrated in FIG. 10, the first part 81 and the second part 82. The first part 81 is a part that overlaps the plurality of first electronic components 3 in plan view from the thickness direction D1 of the mounting substrate 2. The second part 82 is a part that overlaps the second electronic component 4 and the plurality of third electronic components 5 in plan view from the thickness direction D1 of the mounting substrate 2. In the high frequency module 1b according to the third embodiment, the thickness t1 of the first part 81 and the thickness t2 of the second part 82 are the same. "The thickness of the first part and the thickness of the second part are the same" not only represents the case where the thickness of the first part and the thickness of the second part are completely the same but also includes the case where the thickness of the second part with respect to the thickness of the first part is within a predetermined range (for example, ±5%).

As in the high frequency module 1 according to the first embodiment, the height H1 of each of the first electronic components 3 is lower than the height H2 of the second electronic component 4 and the main surface 302 of each of the first electronic components 3 that is near the mounting substrate 2 is in contact with the metal layer 8 in the high frequency module 1b according to the third embodiment. Thus, the substrate 30 of each of the first electronic components 3 does not need to be formed thick, and an increase in the cost can be suppressed compared to the case where the substrate 30 of each of the first electronic components 3 is formed thick. Furthermore, in the high frequency module 1b according to the third embodiment, the step of polishing the metal layer 8 in such a manner that a surface of the metal layer 8 is uniform can be omitted, unlike the case of the high frequency module 1 according to the first embodiment, and a decrease in the work efficiency can further be suppressed.

Fourth Embodiment

Figure 11:
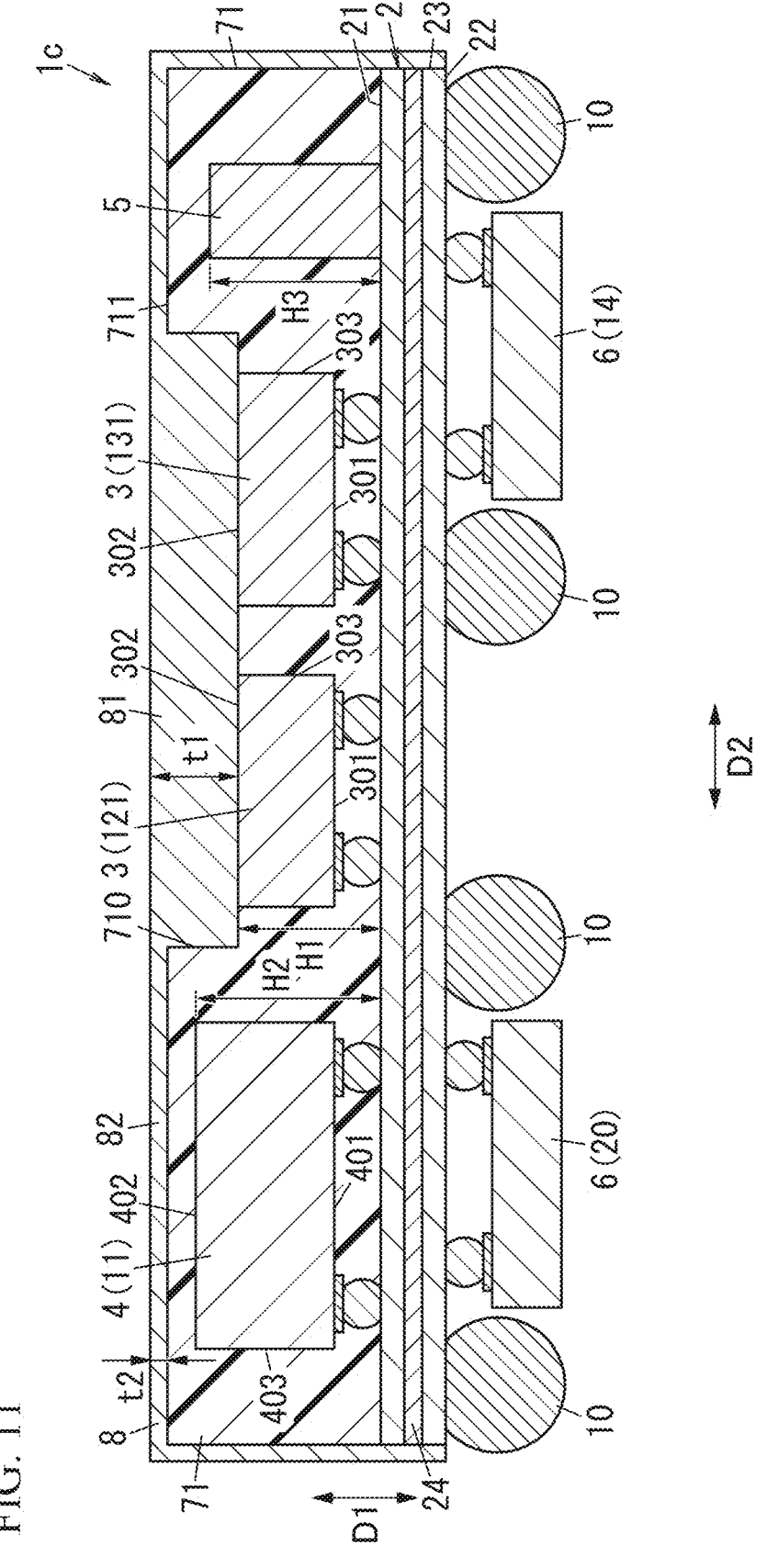
FIG. 11 is a cross-section view of a high frequency module according to a fourth embodiment.

A high frequency module 1c according to the fourth embodiment will be described with reference to FIG. 11. Components of the high frequency module 1c according to the fourth embodiment that are similar to those of the high frequency module 1 according to the first embodiment will be denoted by the same signs, and description of those similar components will be omitted.

The high frequency module 1c according to the fourth embodiment is different from the high frequency module 1 according to the first embodiment (see FIG. 2) in that the plurality of external connection terminals 10 are ball bumps.

The high frequency module 1c according to the fourth embodiment is also different from the high frequency module 1 according to the first embodiment in that the second resin layer 72 of the high frequency module 1 according to the first embodiment is not provided. The high frequency module 1c according to the fourth embodiment may include underfill parts provided in gaps between the fourth electronic components 6 mounted on the second main surface 22 of the mounting substrate 2 and the second main surface 22 of the mounting substrate 2.

A ball bump configuring each of the plurality of external connection terminals 10 is made of, for example, gold, copper, solder, or the like.

Some of the plurality of external connection terminals 10 may be ball bumps and the other external connection terminals 10 may be formed in a rectangular column shape.

Fifth Embodiment

A high frequency module 1d according to a fifth embodiment will be described with reference to FIG. 12. Components of the high frequency module 1d according to the fifth embodiment that are similar to those of the high frequency module 1 according to the first embodiment will be denoted by the same signs, and description of those similar components will be omitted.

The high frequency module 1d according to the fifth embodiment is different from the high frequency module 1 according to the first embodiment (see FIG. 2) in that the main surface 402 of the second electronic component 4 that is far away from the mounting substrate 2 is in contact with the second part 82 of the metal layer 8.

Figure 12:
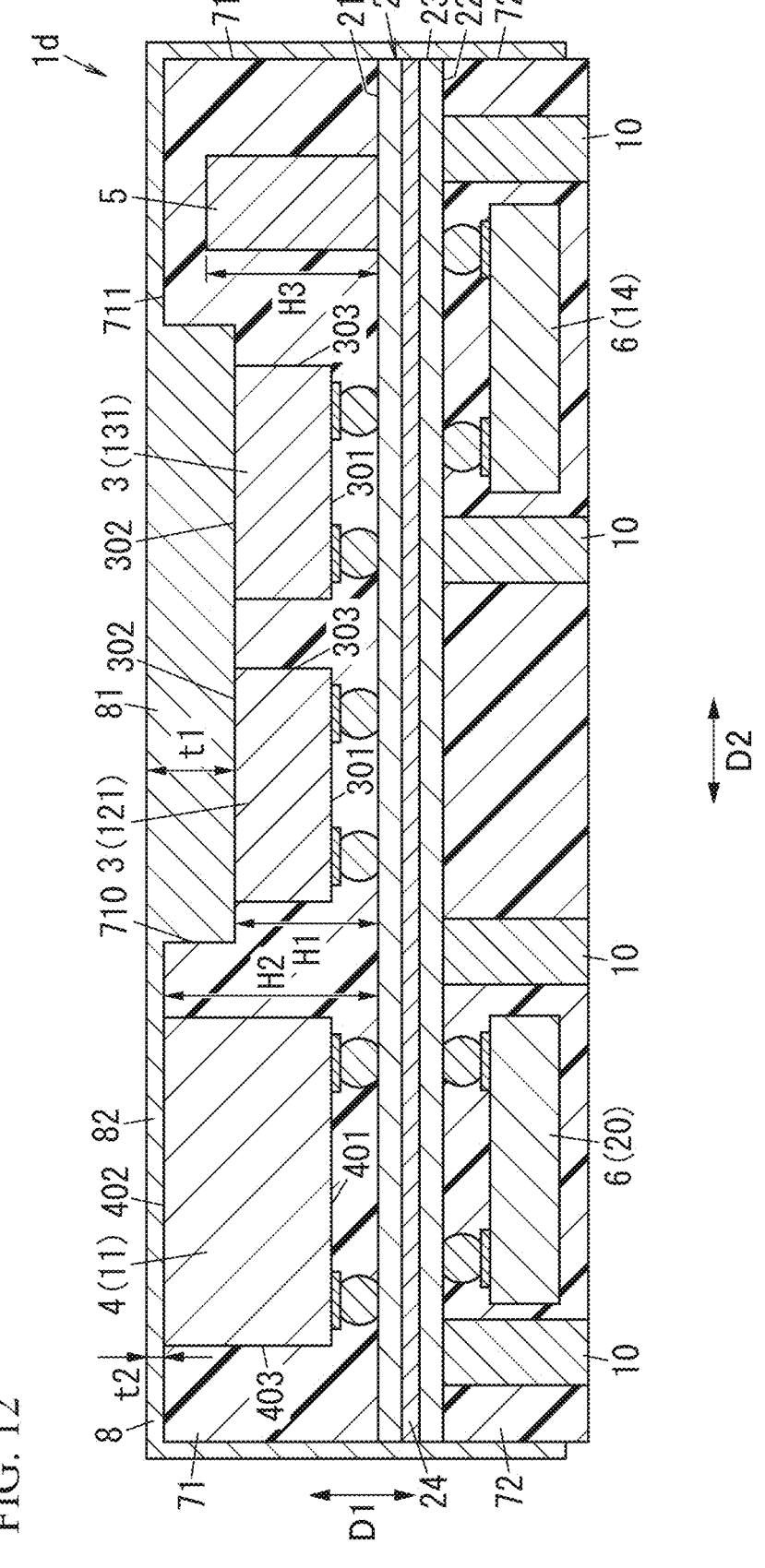
FIG. 12 is a cross-section view of a high frequency module according to a fifth embodiment.

The high frequency module 1d according to the fifth embodiment includes, as illustrated in FIG. 12, the mounting substrate 2, the plurality of first electronic components 3, the second electronic component 4, the plurality of third electronic components 5 (in FIG. 12, only one third electronic component 5 is illustrated), the plurality of fourth electronic components 6, and the plurality of external connection terminals 10. The high frequency module 1d according to the fifth embodiment further includes the first resin layer 71, the second resin layer 72, and the metal layer 8.

The main surface 302 of each of the plurality of first electronic components 3 that is far away from the mounting substrate 2 is in contact with the first part 81 of the metal layer 8. The main surface 402 of the second electronic component 4 that is far away from the mounting substrate 2 is in contact with the second part 82 of the metal layer 8. The thickness t1 of the first part 81 is greater than the thickness t2 of the second part 82 in the thickness direction D1 of the mounting substrate 2.

As in the high frequency module 1 according to the first embodiment, the second electronic component 4 is the power amplifier 11. To make the main surface 402 of the second electronic component 4 that is far away from the mounting substrate 2 in contact with the second part 82 of the metal layer 8, an operation for polishing the first resin layer 71 and the second electronic component 4 is required. Thus, in the high frequency module 1d according to the fifth embodiment, the substrate 40 of the second electronic component 4 is a silicon substrate that is easy to polish compared to a gallium arsenide substrate. That is, a material of the substrate 40 of the second electronic component 4 is silicon.

As in the high frequency module 1 according to the first embodiment, the height H1 of each of the first electronic components 3 is lower than the height H2 of the second electronic component 4 and the main surface 302 of each of the first electronic components 3 that is near the mounting substrate 2 is in contact with the metal layer 8 in the high frequency module 1d according to the fifth embodiment. Thus, the substrate 30 of each of the first electronic components 3 does not need to be formed thick, and an increase in the cost can be suppressed compared to the case where the substrate 30 of each of the first electronic components 3 is formed thick. Furthermore, in the high frequency module 1d according to the fifth embodiment, the main surface 402 of the second electronic component 4 that is far away from the mounting substrate 2 is in contact with the second part 82 of the metal layer 8. Thus, heat generated at the second electronic component 4 can also be dissipated through the metal layer 8.

(Modifications)

Modifications of the first to fifth embodiments will be described below.

Each of the plurality of transmission filters 121 to 123 and the plurality of reception filters 131 to 133 according to the first to fifth embodiments is not limited to a surface acoustic wave filter and may be, for example, a BAW (Bulk Acoustic Wave) filter. A resonator in a BAW filter is, for example, an FBAR (Film Bulk Acoustic Resonator) or an SMR (Solidly Mounted Resonator). A BAW filter includes a substrate. The substrate is, for example, a silicon substrate.

Furthermore, each of the plurality of transmission filters 121 to 123 and the plurality of reception filters 131 to 133 according to the first to fifth embodiments is not limited to a ladder filter and may be, for example, a longitudinally coupled resonator-type surface acoustic wave filter.

Furthermore, the acoustic wave filter described above is an acoustic wave filter using surface acoustic waves or bulk acoustic waves. However, the acoustic wave filter described above does not necessarily use surface acoustic waves or bulk acoustic waves and may use, for example, boundary acoustic waves, plate waves, or the like.

Furthermore, the communication apparatus 9 according to the first embodiment may include, instead of the high frequency module 1, any one of the high frequency modules 1a, 1b, 1c, and 1d.

Furthermore, in the high frequency modules 1, 1a, 1b, 1c, and 1d according to the first to fifth embodiments, the first electronic components 3 include both the transmission filters 121 and 122 and the reception filters 131 and 132. However, the first electronic components 3 may include only the transmission filters 121 and 122 or may include only the reception filters 131 and 132. In short, the first electronic components 3 only need to include at least one of the transmission filters 121 and 122 and the reception filters 131 and 132.

Furthermore, in the high frequency module 1 according to the first embodiment, a surface of the metal layer 8 is uniform. In contrast, as illustrated in FIG. 8, the metal layer 8 may be formed in such a manner that a part of the metal layer 8 that overlaps the second electronic component 4 and the third electronic components 5 protrudes relative to a part of the metal layer 8 that overlaps the first electronic components 3 in the thickness direction D1 of the mounting substrate 2. In this case, a step of polishing the metal layer 8 in such a manner that a surface of the metal layer 8 is uniform can be omitted, and a decrease in the work efficiency can further be suppressed.

Furthermore, in the high frequency modules 1, 1a, 1b, 1c, and 1d according to the first to fifth embodiments, the recessed part 710 is formed by polishing the first resin member 701 by using a polishing machine. However, for example, the recessed part 710 may be formed by etching.

Furthermore, although the metal layer 8 is provided near the first main surface 21 of the mounting substrate 2 in the high frequency modules 1, 1a, 1b, 1c, and 1d according to the first to fifth embodiments, for example, a metal layer may be provided near the second main surface 22 of the mounting substrate 2. In this case, for example, by making the metal layer in contact with the main surface of the fourth electronic component 6, which is disposed on the second main surface 22 of the mounting substrate 2, that is far away from the mounting substrate 2, heat generated at the fourth electronic component 6 can be dissipated through the metal layer.

Furthermore, the thickness t1 of the first part 81 of the metal layer 8 is greater than the thickness t2 of the second part 82 of the metal layer 8 in the first, second, fourth, and fifth embodiments, and the thickness t1 of the first part 81 of the metal layer 8 and the thickness t2 of the second part 82 of the metal layer 8 are the same in the third embodiment. However, the thickness t2 of the second part 82 of the metal layer 8 may be greater than the thickness t1 of the first part 81 of the metal layer 8.

Herein, "an element is disposed on a first main surface of a substrate" not only represents a case where the element is mounted directly on the first main surface of the substrate but also includes a case where the element is disposed in, out of a space near the first main surface and a space near a second main surface that are isolated from each other by the substrate, the space near the first main surface. That is, "an element is disposed on a first main surface of a substrate" includes a case where the element is mounted on the first main surface of the substrate with another circuit element, an electrode, or the like interposed therebetween. The element is, for example, the first electronic component 3, the second electronic component 4, or the third electronic component 5. However, the element is not limited to the first electronic component 3, the second electronic component 4, or the third electronic component 5. The substrate is, for example, the mounting substrate 2. In the case where the substrate is the mounting substrate 2, the first main surface is the first main surface 21 and the second main surface is the second main surface 22.

Herein, "an element is disposed on a second main surface of a substrate" not only represents a case where the element is mounted directly on the second main surface of the substrate but also includes a case where the element is disposed in, out of a space near a first main surface and a space near the second main surface that are isolated from each other by the substrate, the space near the second main surface. That is, "an element is disposed on a second main surface of a substrate" includes a case where the element is mounted on the second main surface of the substrate with another circuit element, an electrode, or the like interposed therebetween. The element is, for example, the fourth electronic component 6. However, the element is not limited to the fourth electronic component 6. The substrate is, for example, the mounting substrate 2. In the case where the substrate is the mounting substrate 2, the first main surface is the first main surface 21 and the second main surface is the second main surface 22.

(Aspects)

Aspects described below are disclosed herein.

According to a first aspect, a high frequency module (1; 1a; 1b; 1c; 1d) includes a mounting substrate (2), a first electronic component (3), a second electronic component (4), a resin layer (71), and a metal layer (8). The mounting substrate (2) has a first main surface (21) and a second main surface (22) that are opposite to each other. The first electronic component (3) and the second electronic component (4) are disposed on the first main surface (21) of the mounting substrate (2). The resin layer (71) is disposed on the first main surface (21) of the mounting substrate (2). The metal layer (8) covers at least part of the resin layer (71). The resin layer (71) covers at least part of an outer peripheral surface (303) of the first electronic component (3) and covers at least part of an outer peripheral surface (403) of the second electronic component (4). The metal layer (8) has a ground potential. The metal layer (8) overlaps at least part of the first electronic component (3) and overlaps at least part of the second electronic component (4) in plan view from a thickness direction (D1) of the mounting substrate (2). A height (H1) of the first electronic component (3) is lower than a height (H2) of the second electronic component (4) in the thickness direction (D1) of the mounting substrate (2). At least part of a main surface (302) of the first electronic component (3) that is far away from the mounting substrate (2) is in contact with the metal layer (8).

According to this aspect, an increase in the cost can be suppressed.

According to a second aspect, in the high frequency module (1; 1a; 1b; 1c) according to the first aspect, a main surface (402) of the second electronic component (4) that is far away from the mounting substrate (2) is not in contact with the metal layer (8).

According to this aspect, a gallium arsenide substrate can be used as a substrate (40) of the second electronic component (4).

According to a third aspect, in the high frequency module (1d) according to the first aspect, at least part of a main surface (402) of the second electronic component (4) that is far away from the mounting substrate (2) is in contact with the metal layer (8).

According to this aspect, heat generated at the second electronic component (4) can be dissipated through the metal layer (8).

According to a fourth aspect, in the high frequency module (1; 1a; 1b; 1c; 1d) according to any one of the first to third aspects, the first electronic component (3) includes at least one of a transmission filter (121, 122, 123) and a reception filter (131, 132, 133). The transmission filter (121, 122, 123) is provided at a transmission path (T1) that is a signal path through which a transmission signal passes. The reception filter (131, 132, 133) is provided at a reception path (R1) that is a signal path through which a reception signal passes.

According to this aspect, heat generated at the transmission filter (121, 122, 123) and the reception filter (131, 132, 133) can be dissipated through the metal layer (8).

According to a fifth aspect, in the high frequency module (1; 1a; 1b; 1c; 1d) according to the fourth aspect, the second electronic component (4) is a power amplifier (11) that is provided at the transmission path (T1).

According to this aspect, in the case where the power amplifier (11) is in contact with the metal layer (8), heat generated at the power amplifier (11) can be dissipated through the metal layer (8).

According to a sixth aspect, in the high frequency module (1; 1a; 1b; 1c; 1d) according to any one of the first to fifth aspects, each of the first electronic component (3) and the second electronic component (4) includes a substrate (30, 40) and a circuit unit (34, 44). The substrate (30, 40) has a third main surface (31, 41) and a fourth main surface (32, 42) that are opposite to each other. The circuit unit (34, 44) is formed on the third main surface (31, 41) of the substrate (30, 40). A thickness (t4) of the substrate (40) of the second electronic component (4) is greater than a thickness (t3) of the substrate (30) of the first electronic component (3).

According to this aspect, the substrate (40) can be easily processed.

According to a seventh aspect, in the high frequency module (1; 1*a*; 1*b*; 1*c*) according to the sixth aspect, a material of the substrate (30) of the first electronic component (3) is silicon. A material of the substrate (40) of the second electronic component (4) is gallium arsenide.

According to this aspect, the reliability of the second electronic component (4) can be improved.

According to an eighth aspect, in the high frequency module (1; 1*a*; 1*c*; 1*d*) according to any one of the first to seventh aspects, the metal layer (8) includes a first part (81) and a second part (82). The first part (81) is a part that overlaps the first electronic component (3) in plan view from the thickness direction (D1) of the mounting substrate (2). The second part (82) is a part that overlaps the second electronic component (4) in plan view from the thickness direction (D1) of the mounting substrate (2). The thickness (t1) of the first part (81) and the thickness (t2) of the second part (82) are different in the thickness direction (D1) of the mounting substrate (2).

According to this aspect, in the case where the thickness (t1) of the first part (81) is greater than the thickness (t2) of the second part (82), the main surface (302) of the first electronic component (3) that is far away from the mounting substrate (2) can be made in contact with the metal layer (8).

According to a ninth aspect, the high frequency module (1; 1*a*; 1*c*; 1*d*) according to the eighth aspect further includes a third electronic component (5). The third electronic component (5) is disposed on the first main surface (21) of the mounting substrate (2). The thickness (t1) of the first part (81) is greater than the thickness (t2) of the second part (82). The first electronic component (3) is disposed between the second electronic component (4) and the third electronic component (5) in a direction (D2) that intersects with the thickness direction (D1) of the mounting substrate (2).

According to this aspect, the isolation between the second electronic component (4) and the third electronic component (5) can be improved.

According to a tenth aspect, in the high frequency module (1; 1*a*; 1*b*; 1*c*; 1*d*) according to any one of the first to ninth aspects, the first electronic component (3) includes a plurality of first electronic components (3). At least part of the main surface (302) of each of the plurality of first electronic components (3) that is far away from the mounting substrate (2) is in contact with the metal layer (8).

According to this aspect, heat generated at the plurality of first electronic components (3) can be dissipated through the metal layer (8).

According to an eleventh aspect, in the high frequency module (1; 1*a*; 1*b*; 1*c*; 1*d*) according to any one of the first to tenth aspects, the mounting substrate (2) further includes a ground layer (24). The metal layer (8) is in contact with the ground layer (24) of the mounting substrate (2).

According to this aspect, the metal layer (8) is capable of functioning as electromagnetic shielding for the inside and outside of the high frequency module (1; 1*a*; 1*b*; 1*c*; 1*d*).

According to a twelfth aspect, the high frequency module (1; 1*a*; 1*b*; 1*c*; 1*d*) according to any one of the first to eleventh aspects further includes a plurality of external connection terminals (10). The plurality of external connection terminals (10) are disposed on the second main surface (22) of the mounting substrate (2).

According to this aspect, the high frequency module (1; 1*a*; 1*b*; 1*c*; 1*d*) can be connected to an external substrate with the plurality of external connection terminals (10) interposed therebetween.

According to a thirteenth aspect, a communication apparatus (9) includes the high frequency module (1; 1*a*; 1*b*; 1*c*; 1*d*) according to any one of the first to twelfth aspects; and a signal processing circuit (92). The signal processing circuit (92) is connected to the high frequency module (1; 1*a*; 1*b*; 1*c*; 1*d*).

According to this aspect, an increase in the cost can be suppressed.

According to a fourteenth aspect, a method for manufacturing a high frequency module (1; 1*a*; 1*b*; 1*c*; 1*d*) includes a first forming step; a second forming step; and a third forming step. The first forming step is a step of forming a resin member (701) on a first main surface (21) of a mounting substrate (2) in such a manner that the resin member (701) covers a first electronic component (3) and a second electronic component (4) disposed on the first main surface (21) of the mounting substrate (2). The mounting substrate (2) has the first main surface (21) and a second main surface (22) that are opposite to each other. A height of the second electronic component (4) is higher than a height of the first electronic component (3) in a thickness direction (D1) of the mounting substrate (2). The second forming step is a step of forming a resin layer (71) that has a recessed part (710) in such a manner that a main surface (302) of the first electronic component (3) that is far away from the mounting substrate (2) is exposed. The third forming step is a step of forming a metal layer (8) that has a ground potential in such a manner that the metal layer (8) covers a main surface (711) of the resin layer (71) that is far away from the mounting substrate (2).

According to this aspect, an increase in the cost can be suppressed.

REFERENCE SIGNS LIST

1, 1*a*, 1*b*, 1*c*, 1*d* high frequency module
11 power amplifier
121, 122, 123 transmission filter
131, 132, 133 reception filter
14 low noise amplifier
15 output matching circuit
16 input matching circuit
17 first switch
171 common terminal
172, 173, 174 selection terminal
18 second switch
181 common terminal
182, 183, 184 selection terminal
19 third switch
191 common terminal
192, 193, 194 selection terminal
20 controller
2 mounting substrate
21 first main surface
22 second main surface
23 outer peripheral surface
3 first electronic component
30 substrate
31 third main surface
32 fourth main surface
33 outer peripheral surface
34 circuit unit
35 IDT electrode 36 pad electrode
301 main surface
302 main surface
303 outer peripheral surface
105 bump
4 second electronic component
40 substrate
41 third main surface
42 fourth main surface
43 outer peripheral surface
44 circuit unit
46 pad electrode
401 main surface
402 main surface
403 outer peripheral surface
106 bump
5 third electronic component
6 fourth electronic component
71 first resin layer (resin layer)
701 first resin member (resin member)
711 main surface
713 outer peripheral surface
72 second resin layer
702 second resin member
723 outer peripheral surface
8 metal layer
81 first part
82 second part
9 communication apparatus
91 antenna
92 signal processing circuit
93 RF signal processing circuit
94 baseband signal processing circuit
10 external connection terminal
101 antenna terminal
102 signal input terminal
103 signal output terminal
104 control terminal
D1 first direction
D2 second direction
D3 third direction
H1, H2, H3 height
SP1 space
R1 reception path
T1 transmission path
t1, t2, t3, t4 thickness

The invention claimed is:

1. A high frequency module comprising:
a mounting substrate that has a first main surface and a second main surface that are opposite to each other;
a first electronic component and a second electronic component that are on the first main surface of the mounting substrate;
a resin layer that is on the first main surface of the mounting substrate; and
a metal layer that covers at least part of the resin layer,
wherein the resin layer covers at least part of an outer peripheral surface of the first electronic component and covers at least part of an outer peripheral surface of the second electronic component,
wherein the metal layer has a ground potential, and overlaps at least part of the first electronic component and overlaps at least part of the second electronic component in a plan view of the high frequency module from a thickness direction of the mounting substrate, wherein a height of the first electronic component is lower than a height of the second electronic component in the thickness direction of the mounting substrate, and
wherein at least part of a main surface of the first electronic component that does not face the mounting substrate is in contact with the metal layer.

2. The high frequency module according to claim 1, wherein a main surface of the second electronic component that does not face the mounting substrate is not in contact with the metal layer.

3. The high frequency module according to claim 1, wherein at least part of a main surface of the second electronic component that does not face the mounting substrate is in contact with the metal layer.

4. The high frequency module according to claim 1, wherein the first electronic component comprises a transmission filter in a transmission path through which a transmission signal passes or a reception filter in a reception path through which a reception signal passes.

5. The high frequency module according to claim 4, wherein the second electronic component is a power amplifier that is in the transmission path.

6. The high frequency module according to claim 1, wherein each of the first electronic component and the second electronic component comprises:
a substrate that has a third main surface and a fourth main surface that are opposite to each other, and
a circuit that is on the third main surface of the substrate, and
wherein a thickness of the substrate of the second electronic component is greater than a thickness of the substrate of the first electronic component.

7. The high frequency module according to claim 6, wherein a material of the substrate of the first electronic component is silicon, and
wherein a material of the substrate of the second electronic component is gallium arsenide.

8. The high frequency module according to claim 1, wherein the metal layer comprises:
a first part that overlaps the first electronic component in the plan view, and
a second part that overlaps the second electronic component in the plan view, and
wherein a thickness of the first part and a thickness of the second part are different in the thickness direction of the mounting substrate.

9. The high frequency module according to claim 8, further comprising:
a third electronic component that is on the first main surface of the mounting substrate,
wherein the thickness of the first part is greater than the thickness of the second part, and
wherein the first electronic component is between the second electronic component and the third electronic component in a direction that intersects the thickness direction of the mounting substrate.

10. The high frequency module according to claim 1, comprising a plurality of first electronic components,
wherein at least part of a main surface of each of the plurality of first electronic components that does not face the mounting substrate is in contact with the metal layer.

11. The high frequency module according to claim 1, wherein the mounting substrate further comprises a ground layer, and
wherein the metal layer is in contact with the ground layer of the mounting substrate.

12. The high frequency module according to claim 1, further comprising:

a plurality of external connection terminals that are on the second main surface of the mounting substrate.

13. A communication apparatus comprising:

the high frequency module according to claim 1; and a signal processing circuit that is connected to the high frequency module.

14. A method for manufacturing a high frequency module, the method comprising:

a first forming step of forming a resin member on a first main surface of a mounting substrate in such a manner that the resin member covers a first electronic component and a second electronic component, the first electronic component being disposed on the first main surface of the mounting substrate, a height of the second electronic component being higher than a height of the first electronic component in a thickness direction of the mounting substrate;

a second forming step of forming a resin layer that has a recessed part in such a manner that a main surface of the first electronic component that does not face the mounting substrate is exposed; and a third forming step of forming a metal layer that has a ground potential in such a manner that the metal layer covers a main surface of the resin layer that does not face the mounting substrate.

\* \* \* \* \*